United States Patent [19]
Foster

[11] Patent Number: 6,065,923
[45] Date of Patent: May 23, 2000

[54] VEHICLE/DOCK ALIGNMENT SYSTEM

[76] Inventor: Raymond Keith Foster, P.O. Box 1, Madras, Oreg. 97741

[21] Appl. No.: 09/076,138

[22] Filed: May 12, 1998

[51] Int. Cl.⁷ .................................................. B65G 69/24
[52] U.S. Cl. ........................ 414/401; 414/353; 414/396; 414/398
[58] Field of Search .................................. 414/352, 353, 414/364, 396, 398, 401, 402, 582, 584; 14/71.3, 71.7

[56] References Cited

U.S. PATENT DOCUMENTS

| | | |
|---|---|---|
| 868,719 | 10/1907 | Stephens . |
| 1,271,676 | 7/1918 | Denman . |
| 1,883,493 | 10/1932 | Berg . |
| 2,050,518 | 8/1936 | Baumgardner ........................ 280/33.44 |
| 2,064,615 | 12/1936 | Kuchar ................................. 280/33.44 |
| 2,489,869 | 11/1949 | Dunn ................................... 414/401 X |
| 2,565,072 | 8/1951 | French ....................................... 214/38 |
| 2,637,454 | 5/1953 | Rowe ........................................ 214/38 |
| 2,643,010 | 6/1953 | Hott et al. ........................... 414/364 X |
| 2,649,217 | 8/1953 | Mertes ..................................... 214/350 |
| 2,693,284 | 11/1954 | Gerhardt ................................. 414/584 |
| 2,714,735 | 8/1955 | Watson ........................................ 14/71 |
| 2,945,396 | 7/1960 | Stultz, Jr. .................................. 74/533 |
| 3,250,408 | 5/1966 | Daniluk et al. ........................... 214/38 |
| 3,368,229 | 2/1968 | Pfleger ........................................ 14/71 |
| 3,397,802 | 8/1968 | Hinchee ................................... 214/38 |
| 3,400,525 | 9/1968 | Snavely ..................................... 56/214 |
| 3,400,949 | 9/1968 | Kendall ................................... 280/490 |
| 3,646,627 | 3/1972 | Potter ........................................ 14/71 |
| 3,692,330 | 9/1972 | Kendall ................................... 280/402 |
| 3,699,601 | 10/1972 | Hecker, Jr. et al. ........................ 14/71 |
| 3,708,183 | 1/1973 | Jones ..................................... 280/483 |
| 3,865,406 | 2/1975 | Dutton ................................... 280/490 |
| 3,871,534 | 3/1975 | Bursk .................................... 214/83.3 |
| 3,922,006 | 11/1975 | Borges ................................... 280/415 |
| 3,954,192 | 5/1976 | Watts ..................................... 414/398 |
| 3,961,714 | 6/1976 | Buehler ................................... 214/41 |
| 4,002,353 | 1/1977 | Sysyn ..................................... 280/490 |
| 4,016,989 | 4/1977 | Furnari ............................... 414/364 X |
| 4,076,273 | 2/1978 | Campion ................................. 280/490 |
| 4,127,856 | 11/1978 | Bickel .................................... 340/687 |
| 4,137,587 | 2/1979 | Rosengren .............................. 14/71.3 |
| 4,148,798 | 4/1979 | Taylor, Jr. .............................. 280/482 |
| 4,208,161 | 6/1980 | Hipp et al. ............................. 414/401 |
| 4,261,682 | 4/1981 | Papps et al. ........................... 414/528 |
| 4,264,259 | 4/1981 | Hipp ...................................... 414/401 |
| 4,267,748 | 5/1981 | Grunewald et al. ....................... 74/529 |

(List continued on next page.)

FOREIGN PATENT DOCUMENTS

| | | |
|---|---|---|
| 2 588 807 | 10/1985 | France . |
| 24 52 648 | 6/1975 | Germany . |
| 93/01952 | 2/1993 | WIPO ................................ 414/402 |

*Primary Examiner*—James W. Keenan
*Attorney, Agent, or Firm*—Delbert J. Barnard

[57] ABSTRACT

A dock (D) is provided with a reciprocating slat conveyor (12). A trailer (T) is provided with a reciprocating slat conveyor (10). The dock (D) includes a dock end (100) that includes mechanism for aligning the trailer conveyor (10) with the dock conveyor (12). This mechanism includes a guide rail 108 that is secured to a vehicle supporting apron (106) and is positioned to fit between the wheels (W) on one side of the rear of the trailer, for guiding the wheels towards the dock (D). The dock end (100) includes lifting rods (18, 20) which include lifting cams (22, 24). The cams (22, 24) are initially positioned below rear corner portions (14, 16) of the trailer (T). The lifter rods (18, 20) are then rotated to move the lifting cams (22, 24) up into a lifting position against the corner portions (14, 16). The lifter rods (18, 20) and cams (22, 24) are rotated to effect a vertical adjustment in position of the trailer conveyor (10) relative to the dock conveyor (12). A pair of positioning beams (126, 128) are located between two vertical frame members (122, 124) that are a part of the rear end structure of the trailer. The beams (126, 128) are pulled apart, with one of them going against one of the vertical frame members (122, 124), if necessary, for correcting the horizontal alignment of the rear end of the trailer (T).

28 Claims, 21 Drawing Sheets

U.S. PATENT DOCUMENTS

| | | | |
|---|---|---|---|
| 4,373,847 | 2/1983 | Hipp et al. | 414/401 |
| 4,469,277 | 9/1984 | Howes | 414/401 X |
| 4,589,813 | 5/1986 | Hagen et al. | 414/401 |
| 4,674,941 | 6/1987 | Hageman | 414/401 |
| 4,695,216 | 9/1987 | Erlandsson | 414/401 |
| 4,728,242 | 3/1988 | Erlandsson | 414/401 |
| 4,759,678 | 7/1988 | Hageman | 414/401 |
| 4,765,792 | 8/1988 | Cherry et al. | 414/401 |
| 4,821,868 | 4/1989 | Foster | 198/750 |
| 4,861,217 | 8/1989 | Erlandsson | 414/401 |
| 4,915,568 | 4/1990 | West | 414/401 |
| 4,936,731 | 6/1990 | Noble | 414/401 |
| 4,938,647 | 7/1990 | Erlandsson | 414/401 |
| 4,940,378 | 7/1990 | Feldmann et al. | 414/401 |
| 4,940,379 | 7/1990 | Staege | 414/401 |
| 4,946,330 | 8/1990 | Pedersen et al. | 414/401 |
| 4,950,119 | 8/1990 | Nord et al. | 414/584 X |
| 4,964,777 | 10/1990 | Kleynjans et al. | 414/401 |
| 4,969,792 | 11/1990 | Ellis et al. | 414/401 |
| 4,973,213 | 11/1990 | Erlandsson | 414/401 |
| 5,026,242 | 6/1991 | Alexander | 414/401 |
| 5,054,987 | 10/1991 | Thornton | 414/390 |
| 5,071,306 | 12/1991 | Alexander | 414/401 |
| 5,096,359 | 3/1992 | Alexander | 414/401 |
| 5,120,181 | 6/1992 | Alexander | 414/401 |
| 5,165,524 | 11/1992 | Foster | 198/750 |
| 5,203,663 | 4/1993 | Ruppe | 414/401 |
| 5,212,846 | 5/1993 | Hahn | 14/69.5 |
| 5,249,905 | 10/1993 | Warner et al. | 414/401 |
| 5,259,718 | 11/1993 | Alexander | 414/401 |
| 5,297,921 | 3/1994 | Springer et al. | 414/401 |
| 5,336,033 | 8/1994 | Alexander | 414/401 |
| 5,346,353 | 9/1994 | Alexander | 414/401 |
| 5,348,437 | 9/1994 | Krupke et al. | 414/401 |
| 5,374,154 | 12/1994 | Alten | 414/537 |
| 5,388,947 | 2/1995 | Ancel et al. | 414/401 |
| 5,454,682 | 10/1995 | Alexander | 414/401 |
| 5,457,838 | 10/1995 | Gelder et al. | 14/69.5 |
| 5,487,462 | 1/1996 | Gilmore | 198/594 |
| 5,544,739 | 8/1996 | Christinaens et al. | 198/750 |
| 5,645,390 | 7/1997 | Filiberti et al. | 414/390 |
| 5,664,929 | 9/1997 | Esaki et al. | 414/398 |
| 5,664,930 | 9/1997 | Ellis | 414/401 |
| 5,762,460 | 6/1998 | Rae | 414/401 |

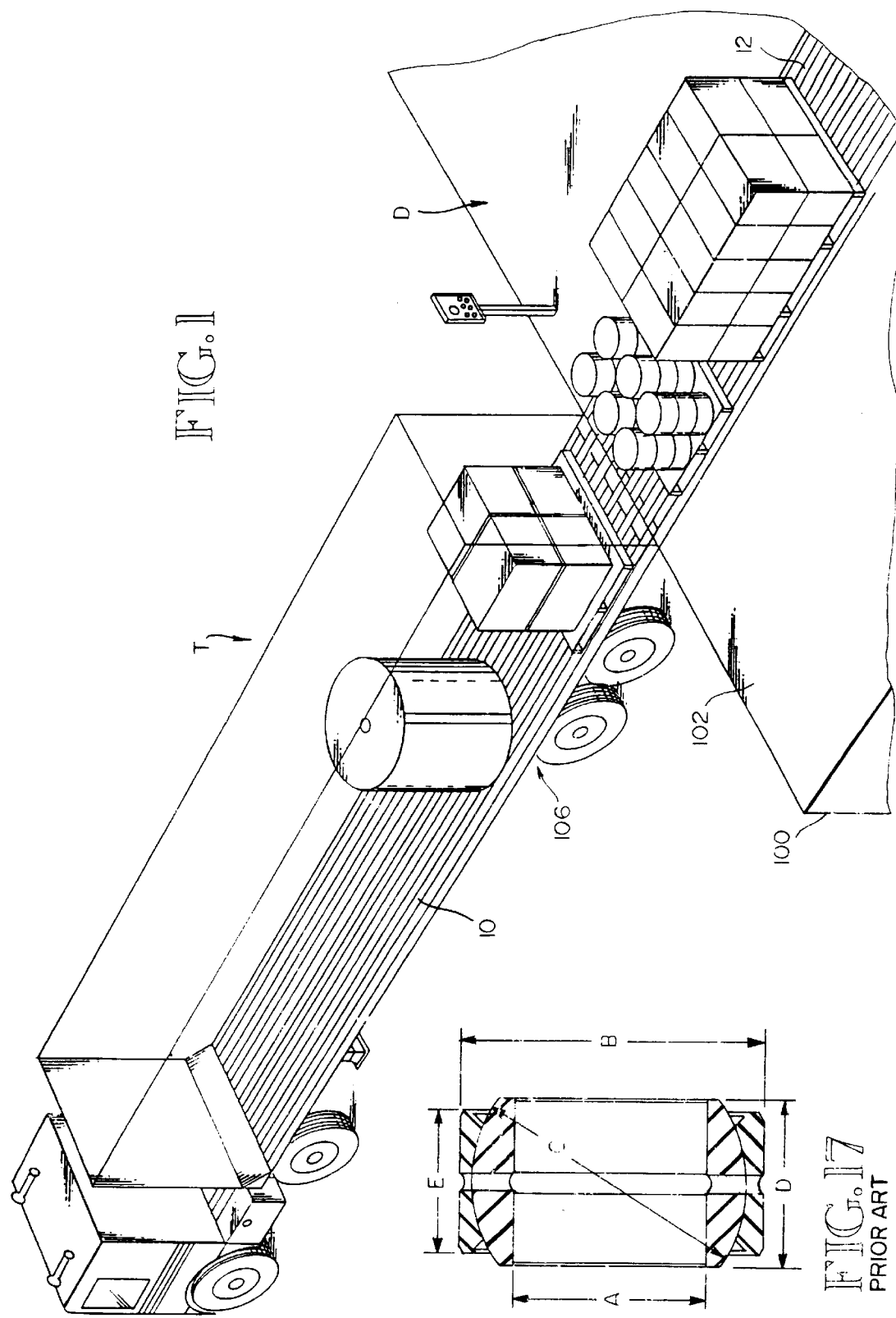

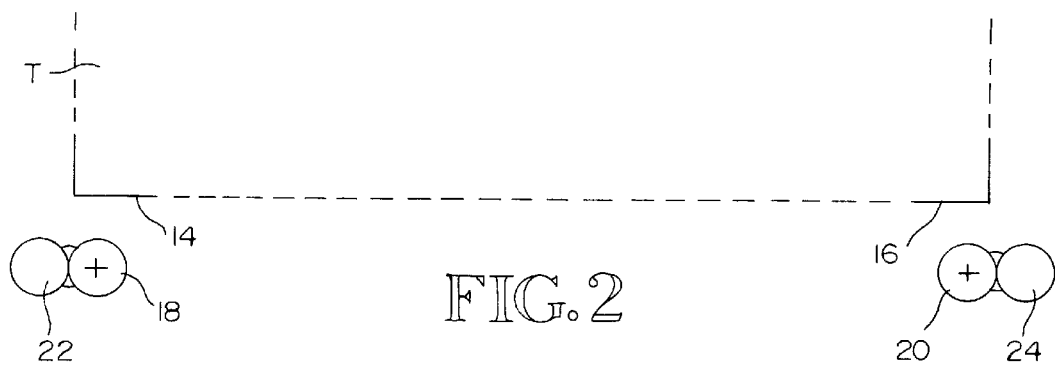
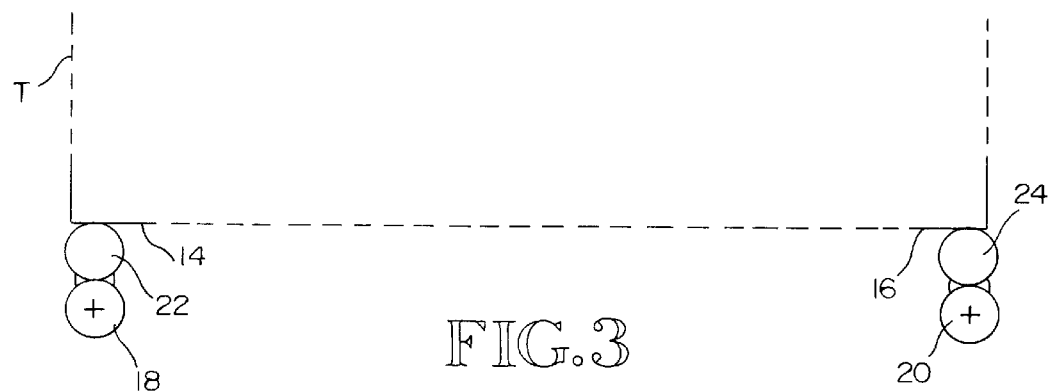
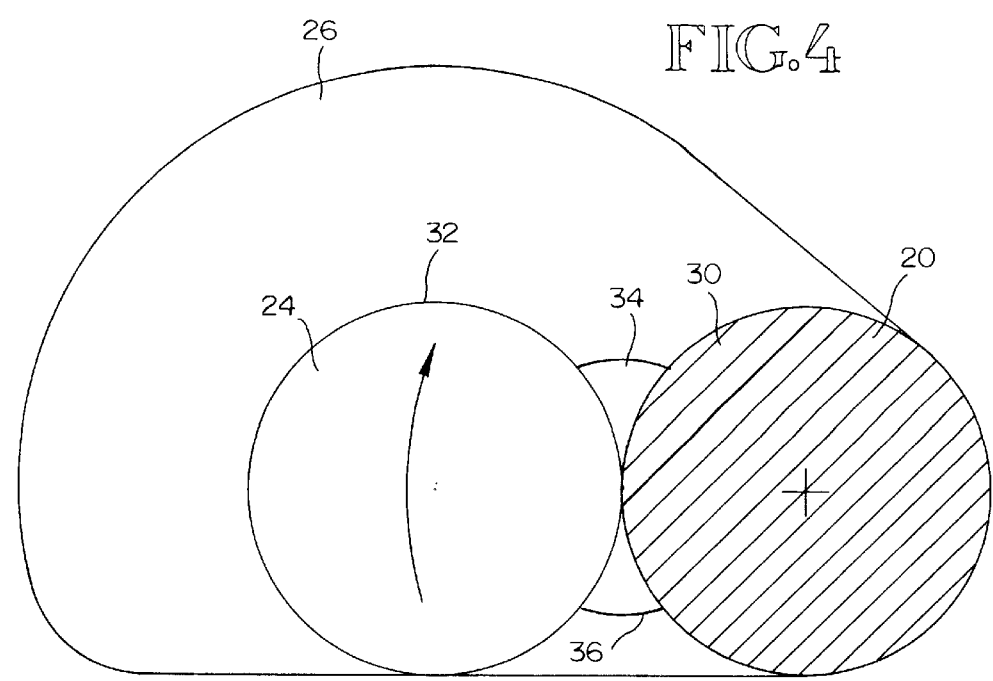

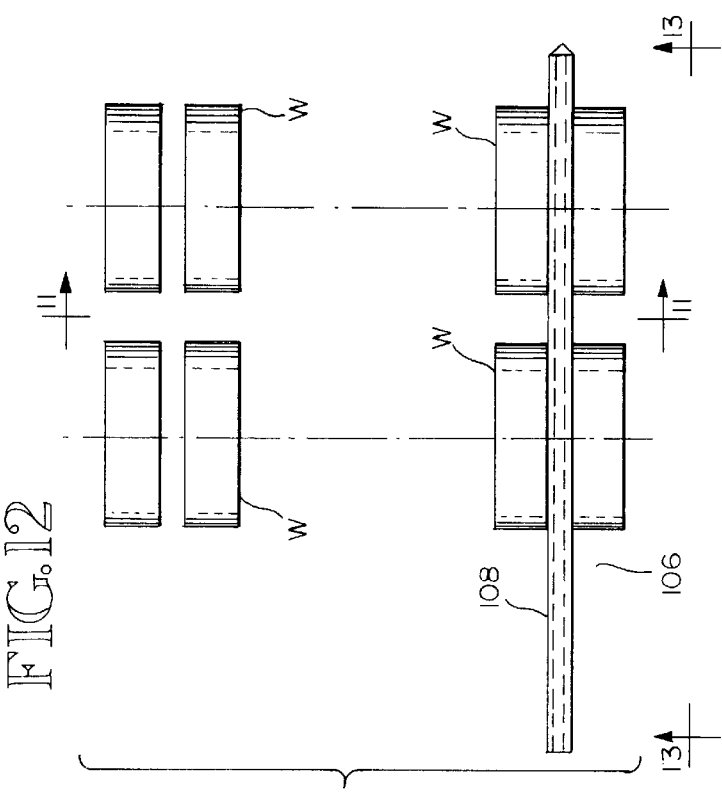
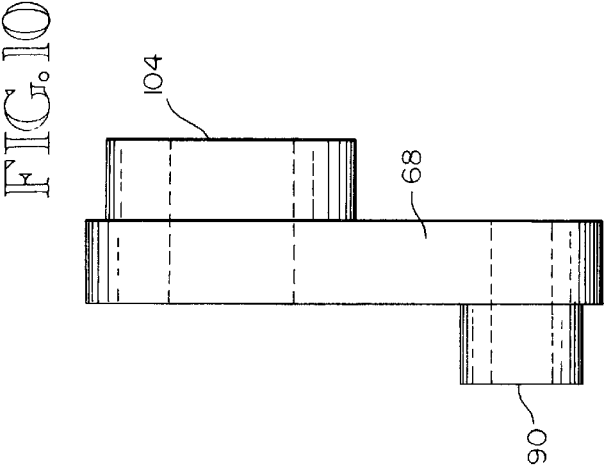
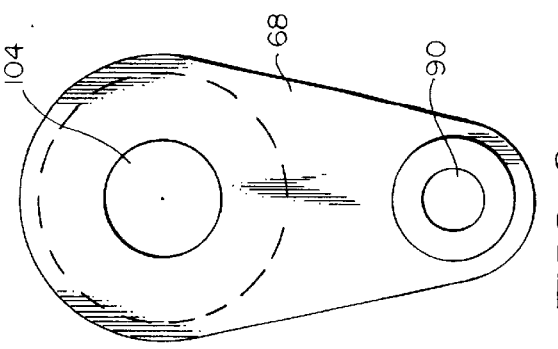
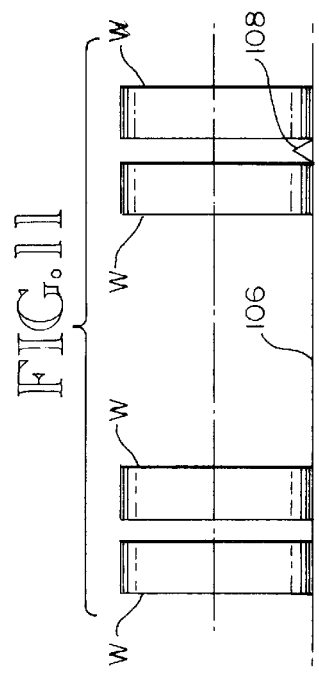
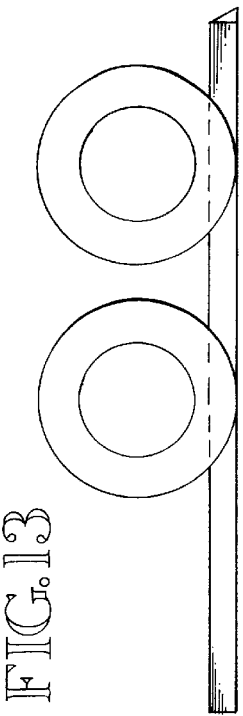

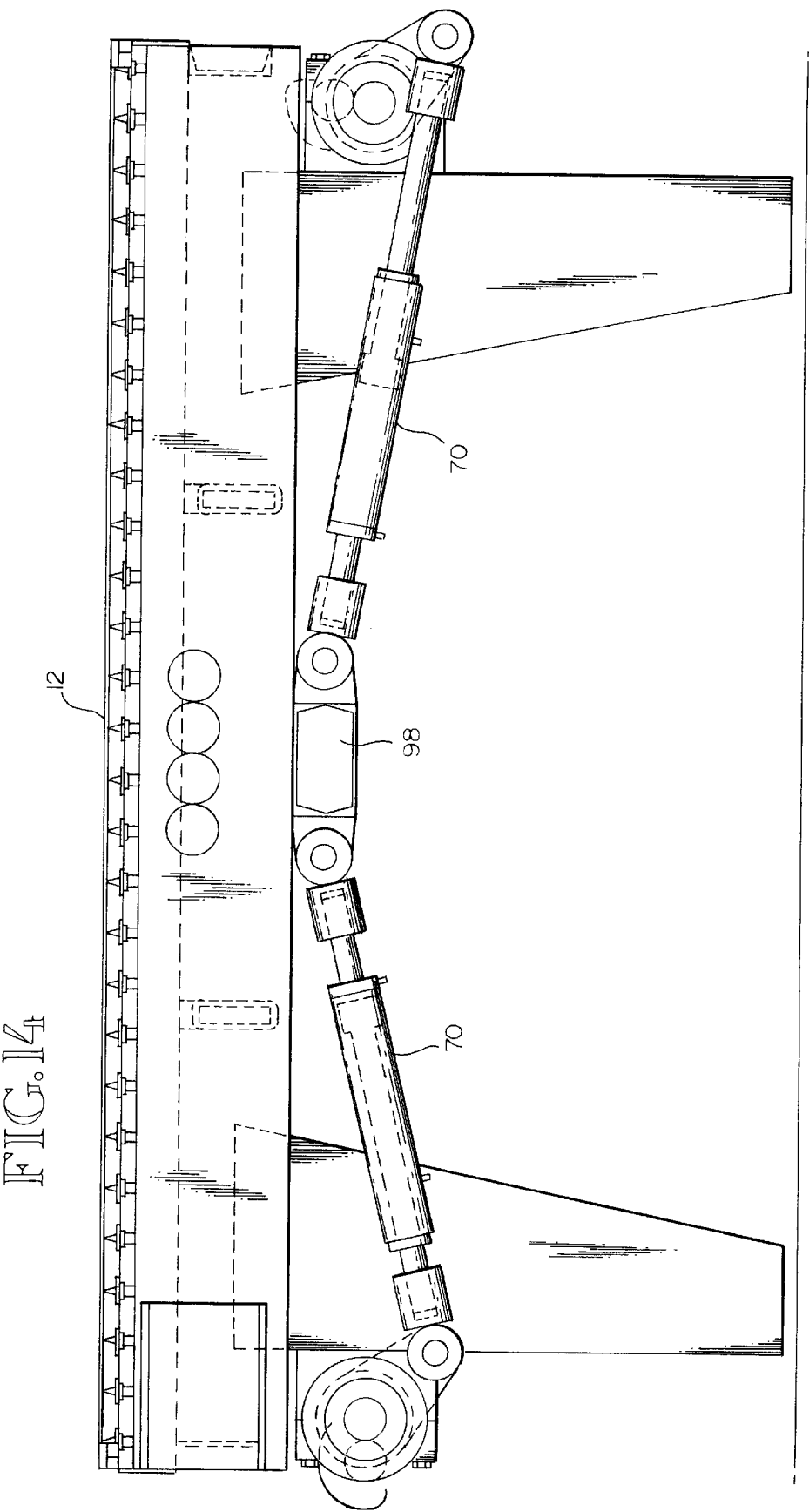

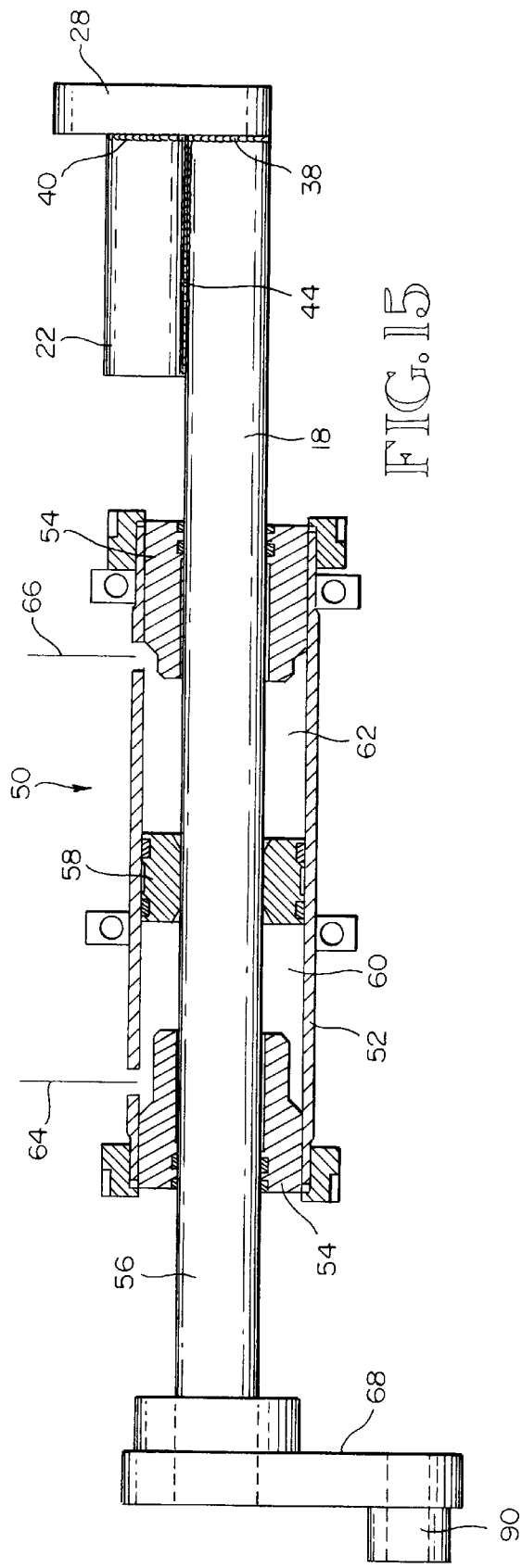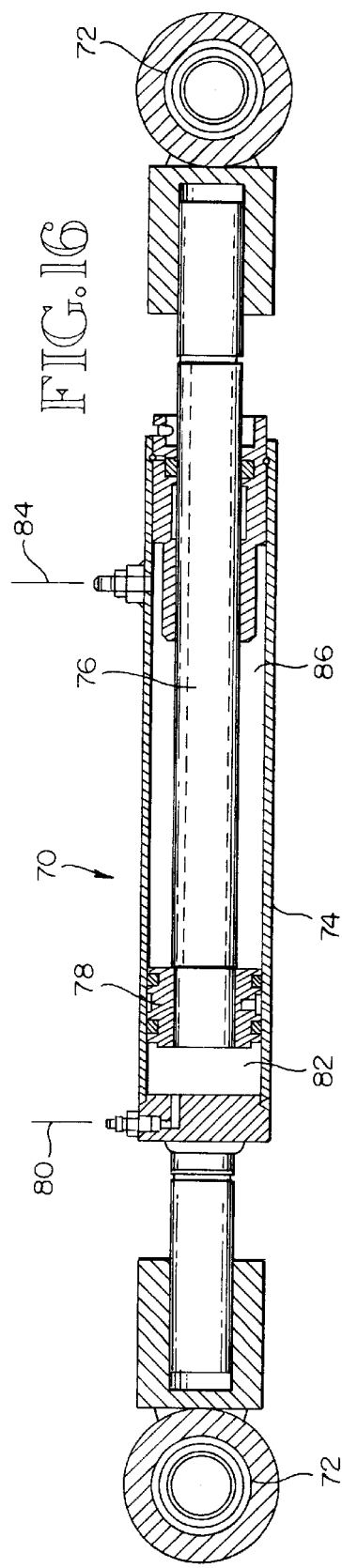

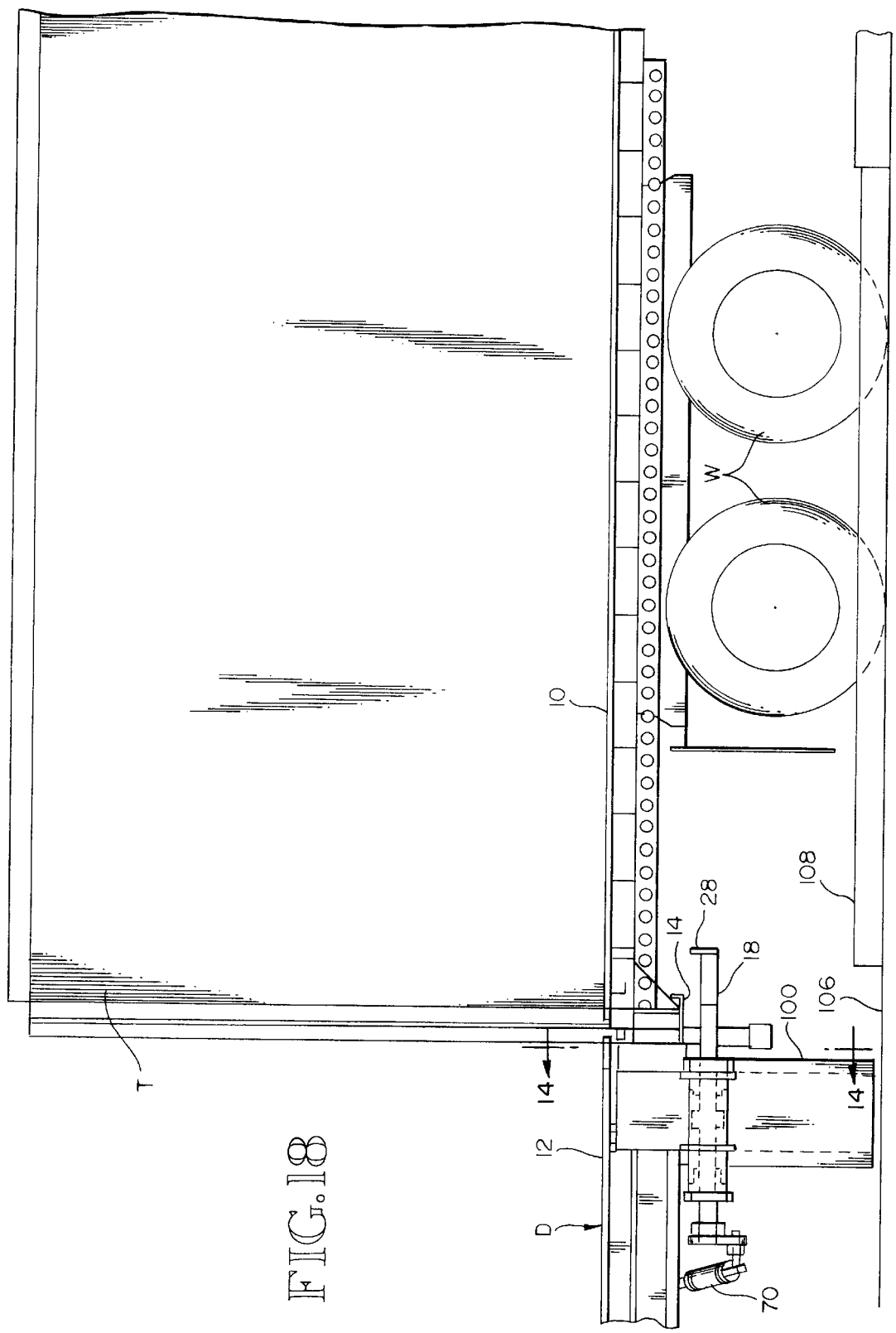

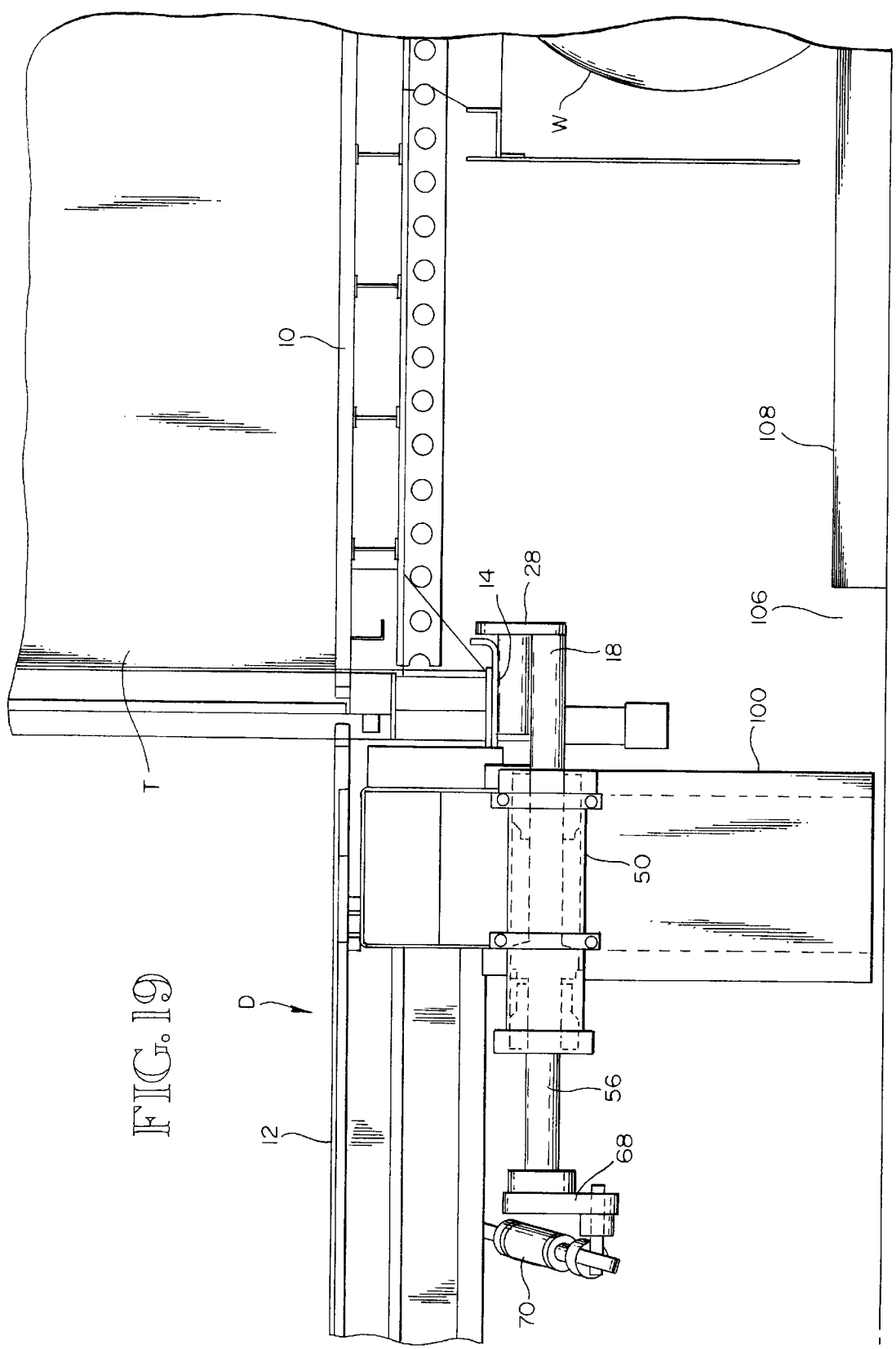

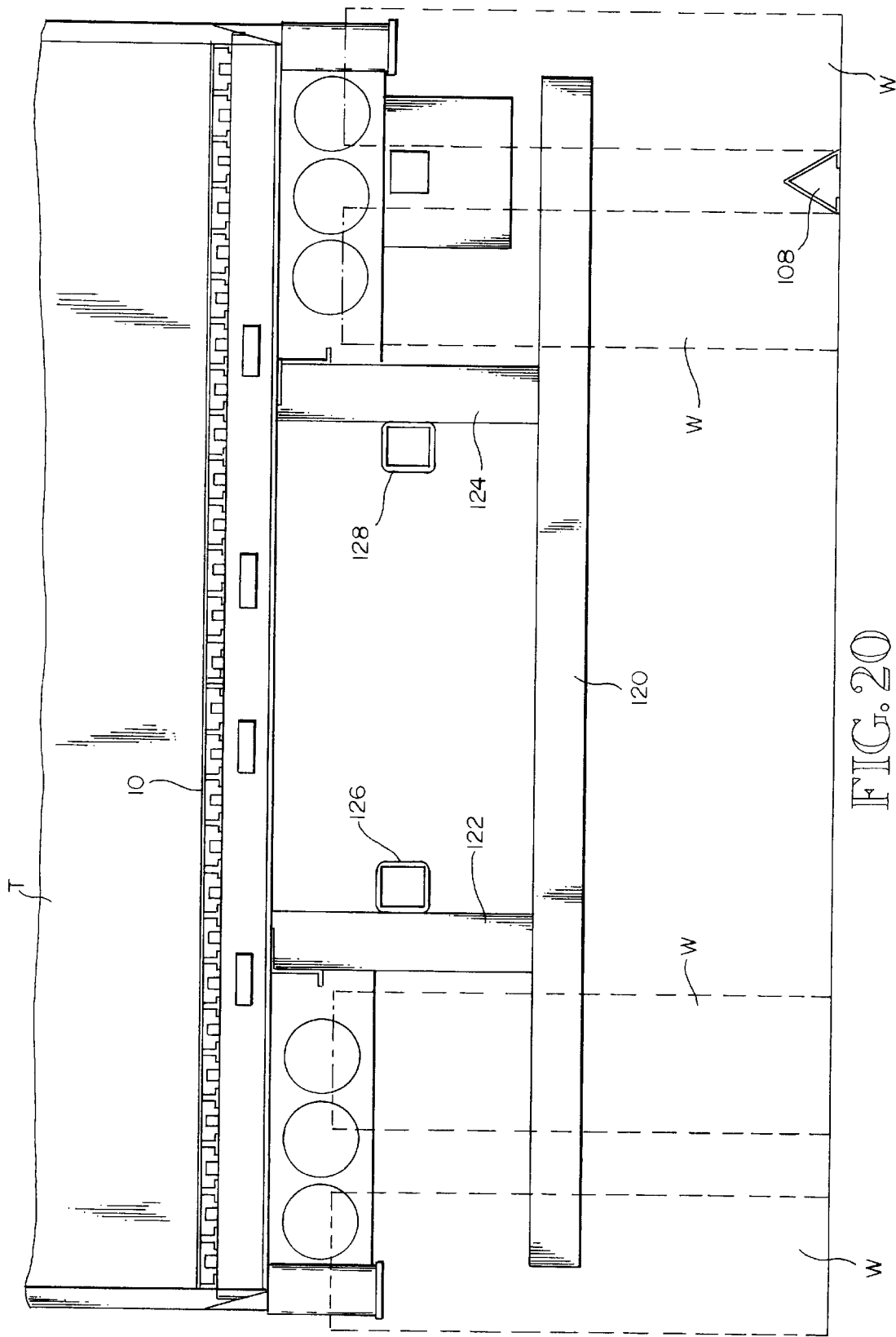

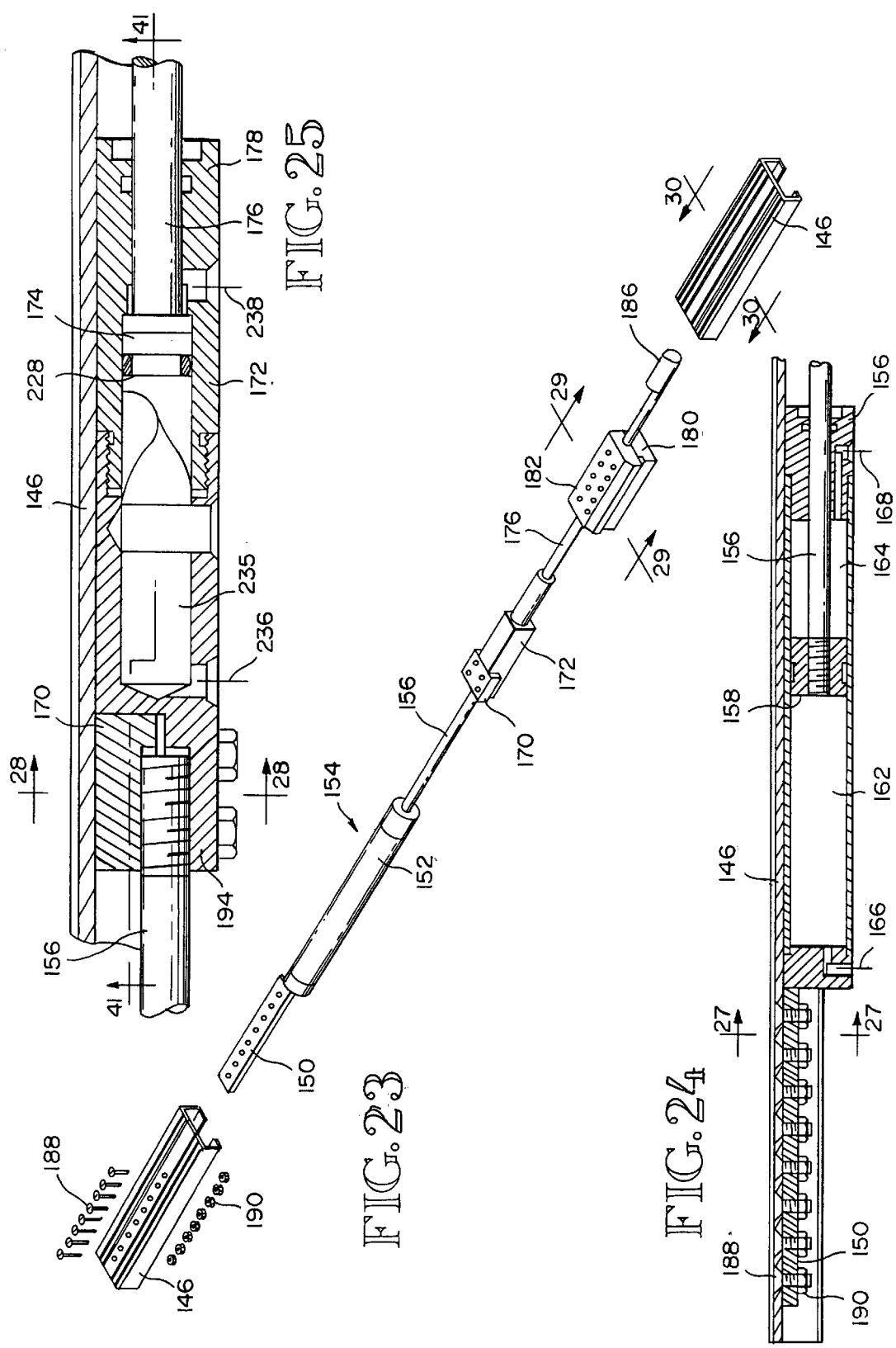

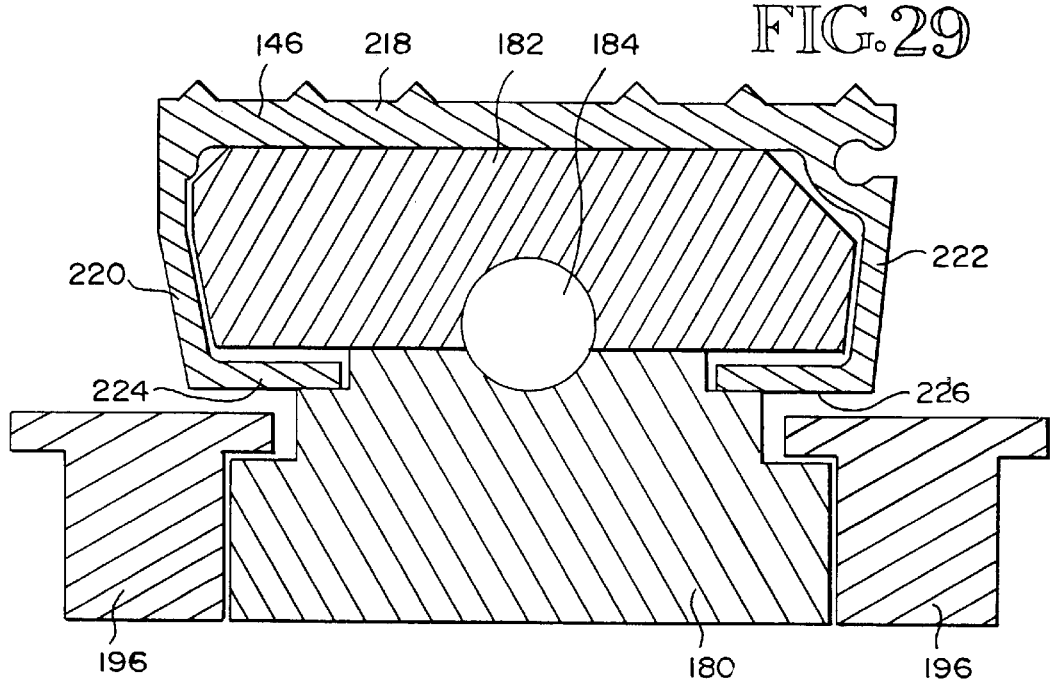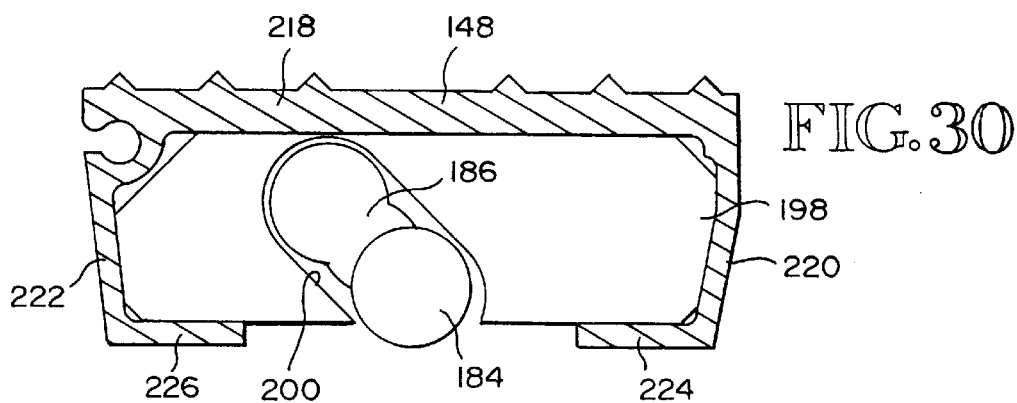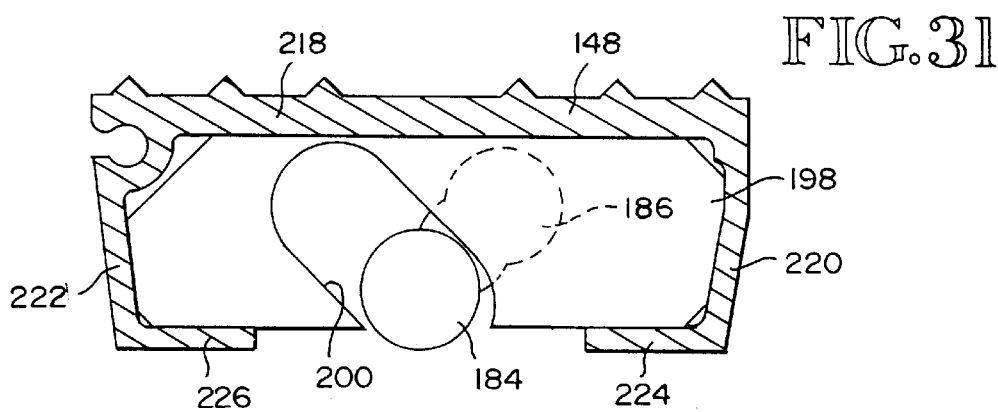

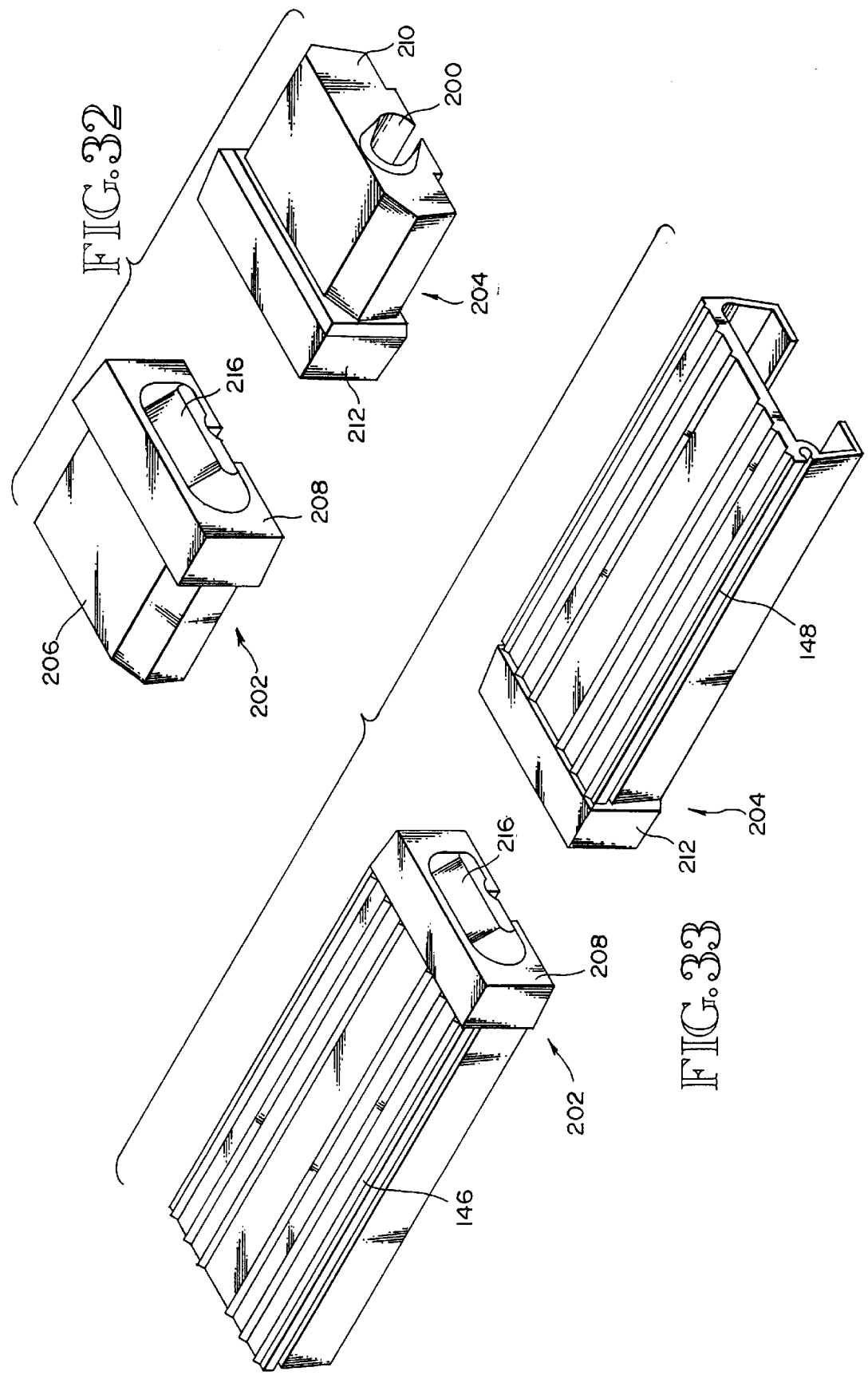

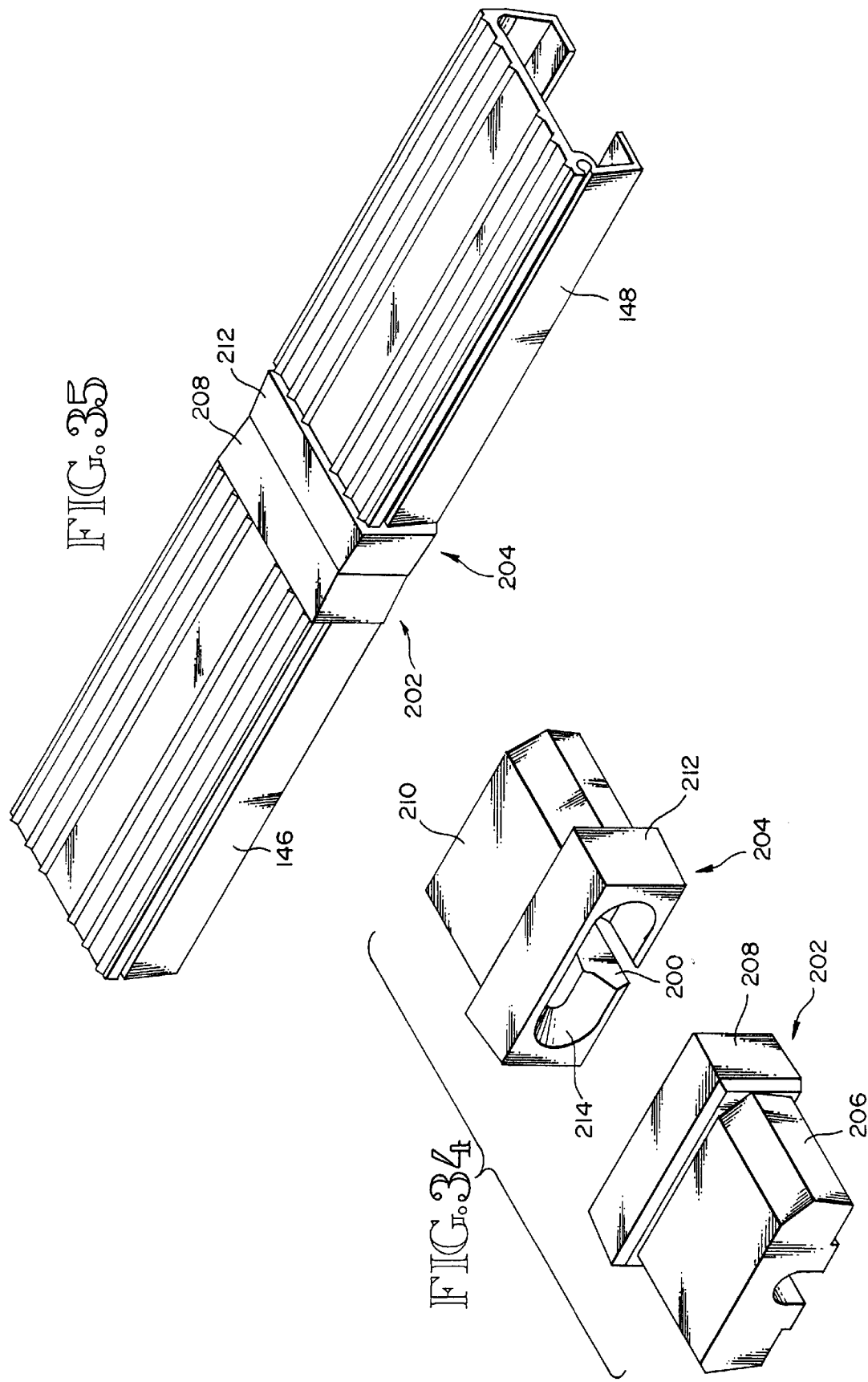

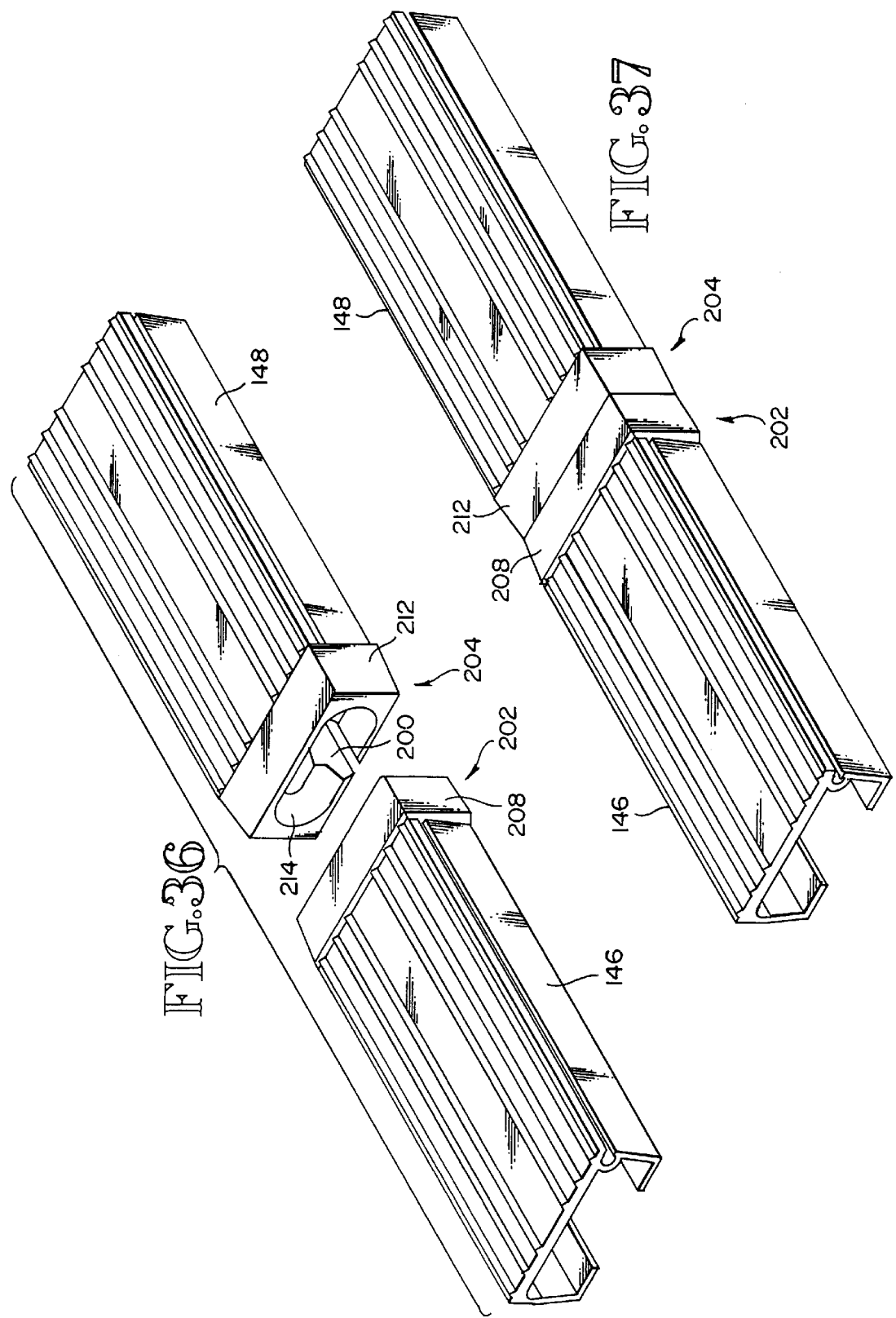

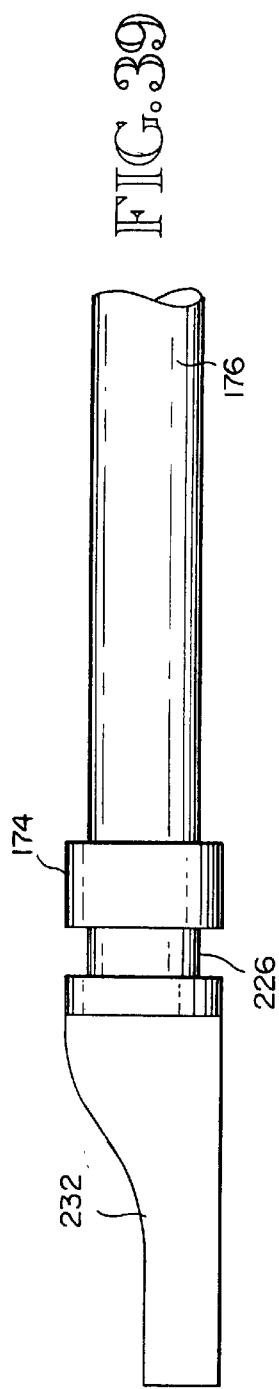
FIG. 39
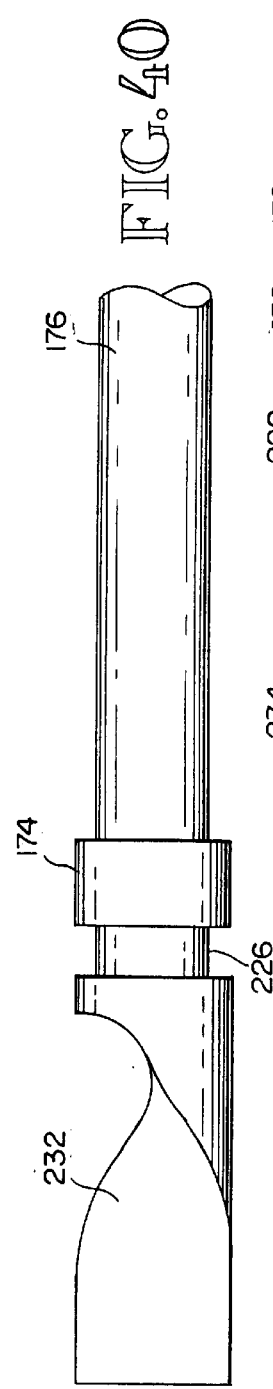
FIG. 40
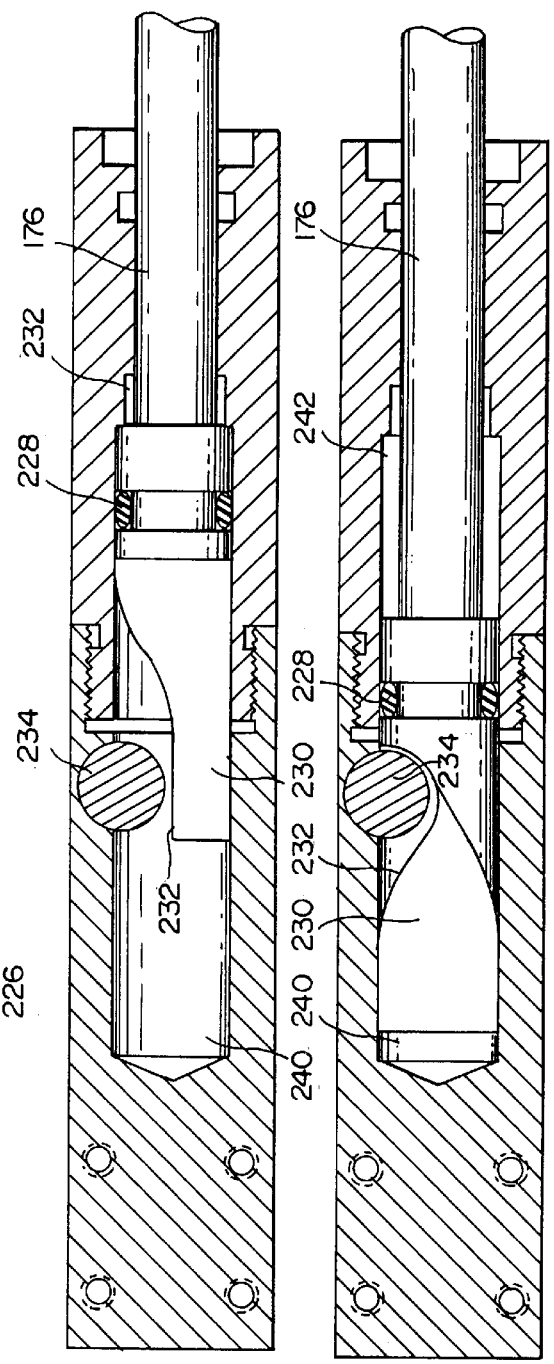
FIG. 41
FIG. 42

VEHICLE/DOCK ALIGNMENT SYSTEM

TECHNICAL FIELD

This invention relates to the movement of cargo from a dock to a trailer or other vehicle or from the vehicle to the dock. More particularly, the invention relates to the provision of mechanism for aligning a vehicle floor with a dock floor. The alignment mechanism of the invention is particularly useful when the vehicle floor and the dock floor are reciprocating slat conveyors but is not limited to this use.

BACKGROUND OF THE INVENTION

There is a need for mechanisms for positioning the load carrying floor of a vehicle, such as a trailer, relative to a dock, for facilitating movement of cargo from the vehicle floor to the dock floor or from the dock floor to the vehicle floor. A principal object of the present invention is to provide an improved mechanism or system for moving a vehicle floor into alignment with a dock floor. It is known to equip trailers with reciprocating slat conveyors and using the conveyors together for loading and unloading the trailer. The use of a slat conveyor on the dock together with a slat conveyor within a trailer or other vehicle is the subject matter of Copending application Ser. No. 09/076,505, filed concurrently, herewith on May 12, 1998, and entitled Vehicle/Dock Loading/Unloading Conveyor System now U.S. Pat. No. 5,911,555, granted Jun. 15, 1999. The alignment mechanism or system of the present invention has a particular utility for aligning a vehicle/conveyor with a dock/conveyor.

There are basically two kinds of reciprocating slat conveyors on the market today. The first and most popular reciprocating slat conveyor is characterized by a plurality of elongated conveyor slats which are divided into sets and groups. By way of typical and therefore nonlimitive example, a conveyor of this type may include eight groups and three sets, with each group comprising one slat from each set. That is, each group includes a set "1" slat, followed by a set "2" slat followed by a set "3" slat. The groups extend side-by-side across the conveyor. The conveyor slats are supported on a conveyor frame, each for longitudinal back and forth movement. A drive mechanism is provided for the conveyor slats. The drive mechanism operates to move all of the conveyor slats in unison, in a first direction, for conveying a load that is on the conveyor. Then, the conveyor slats are retracted, one set at a time, back to a start position. As each set is retracted, the remaining sets are stationary and function to hold the load in position. Following retraction of all sets, the conveyor slats are again moved in unison in the first direction for conveying the load on the conveyor an additional step. Examples of this type of conveyor are disclosed by U.S. Pat. No. 4,821,868, granted Apr. 18, 1989, to Raymond Keith Foster, and entitled Drive/Frame Assembly For A Reciprocating Floor; by U.S. Pat. No. 5,165,524, granted Nov. 24, 1992, to Raymond Keith Foster, and entitled Reciprocating Floor Conveyor; and by U.S. Pat. No. 5,605,221, granted Feb. 25, 1997, to Raymond Keith Foster and entitled Drive Unit With Bearing Mount. As is disclosed by these patents, sometimes a transverse drive beam is provided for each set of conveyor slats. Each transverse drive beam is connected to its set of conveyor slats and to a linear hydraulic drive unit for reciprocating the drive beam and the conveyor slats back and forth longitudinally of the conveyor. U.S. Pat. No. 5,165,524 discloses connecting the linear hydraulic drive units to one conveyor slat from each set at a location spaced from the transverse drive beams. The force generated by each drive unit is transmitted to the conveyor slat to which the drive unit is connected and from that conveyor slat to the transverse drive beam to which the conveyor slat is connected and onto the remaining slats of the set. U.S. Pat. No. 5,605,221 discloses providing a separate linear hydraulic drive unit for each conveyor slat.

The second type of reciprocating slat conveyor provides a continuous movement of the load on the conveyor. A majority of the conveyor slats are always moving in the conveying direction while a minority of the conveyor slats are retracting. An example of this type of conveyor is disclosed by pending U.S. application Ser. 08/827,620, filed Apr. 9, 1997, by Raymond Keith Foster, et al., and entitled Continuously Advancing Reciprocating Slat Conveyor.

U.S. Pat. Nos. 4,821,868; 5,165,524, 5,605,221, 5,911, 555, and application Ser. No. 08/827,620 are hereby incorporated herein by this reference to them.

DISCLOSURE OF THE INVENTION

In accordance with a first aspect of the invention, a vehicle supporting apron leads to a dock end that extends vertically from the vehicle supporting apron to a dock floor that is elevated above the vehicle supporting apron. The dock end includes a pair of laterally spaced apart lifters. Each lifter includes a rotatable lifter rod and a lifting cam on the lifter rod. The lifter rods extend substantially horizontally, substantially parallel to each other and substantially perpendicular to the dock end. A vehicle having a cargo space and a cargo space floor is backed up on the vehicle supporting apron, towards the dock end, to place the cargo space floor substantially in line with the dock floor. Then, the lifter rods are rotated to move the lifting cams upwardly against a rear portion of the vehicle, to cause the cams to lift the rear portion of the vehicle and raise the cargo space floor up to a level substantially even with the dock floor.

The lifter rods may be rotatable between a first position in which the cams are below and out of lifting contact with the rear portion of the vehicle, and a second position in which the cams are in lifting contact with the rear portion of the vehicle. Preferably, the rotatable lifter rods are also movable axially, so that they can be moved axially to position the cams relative to the rear portion of the vehicle.

Preferably, the lifter rods have hook portions that are engageable with the rear portion of the vehicle when the cams are in lifting contact with the rear portion of the vehicle and the lifter rods are moved axially towards the dock end. This axial movement of the lifter rods moves the hooks into contact with the rear portion of the vehicle where they will serve to restrain movement of the vehicle away from the dock end.

Preferably, the rotatable lifter rods are piston rod portions of linear hydraulic motors. The linear hydraulic motors further include cylinder bodies mounted on the dock end through which the rotatable lifter rods project. There are piston heads on the rotatable lifter rods inside of the cylinder bodies. The cylinder bodies provide working chambers on opposite sides of the piston heads.

In preferred form, the rotatable lifter rods have first end portions that project axially outwardly from first end portions of the cylinder bodies, away from the dock end and towards the vehicle. The lifting cams are on the first end portions of the rotatable lifter rods. Preferable also, the rotatable lifter rods have second end portions that project axially outwardly from second ends of the cylinder bodies that are opposite the first ends. A rotator is connected to the second end portion of each rotatable lifter rod. The rotator serves to rotate the lifter rod between its first and second positions.

In preferred form, the rotator includes an arm that projects radially from the second end portion of each rotatable lifter rod. The dock further comprises a second linear hydraulic motor associated with each rotatable lifter rod. Each second linear hydraulic motor is connected at a first end to the dock end and a second end to the radial arm. The second linear hydraulic motors are extendable and retractable for swinging the radial arms to rotate the lifter rods. Also in preferred form, each second linear hydraulic motor has a pivot connection at each of its ends. This allows each second linear hydraulic motor to pivot and swing in position in response to its extension and retraction and/or rotation and/or axial movement of the rotatable lifter rod to which it is connected.

According to an aspect of the invention, the dock floor and the cargo space floor in the vehicle are reciprocating slat conveyors.

According to another aspect of the invention, the dock end includes a mechanism for engaging and imposing a sideways force on a rear portion of the vehicle for moving the cargo space floor of the vehicle sideways towards proper alignment with the dock floor.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, and:

FIG. 1 is a pictorial view of a trailer backed up to a dock, for either receiving or depositing a load, such view being taken from above and looking towards the top, the driver's side and the rear end of the trailer, with the interior of the trailer shown for the purpose of depicting cargo that is on a reciprocating slat conveyor that forms the floor of the trailer, such view also showing a complementary slat conveyor on the dock;

FIG. 2 is a schematic view looking towards the rear end of the trailer, showing a pair of laterally spaced apart lifters each in a first position in which lifting cams carried by the lifters are below and out of contact with rear corner portions of the trailer;

FIG. 3 is a view like FIG. 2 but showing the lifters rotated to place the lifting cams into lifting contact with the rear corner portions of the trailer;

FIG. 4 is an enlarged scale sectional view taken through a lifter rod portion of a lifter, showing the lifter rod in its first position, and including an arrow that indicates the direction of rotation of the lifter rod towards its second position;

FIG. 9 is an end view of a crank arm that is connected to the dock end of the lifter rod;

FIG. 10 is a side elevational view of the crank shown by FIG. 9;

FIG. 11 is an elevational view of the rear wheel assembly of the trailer, such view presenting an end view of a guide rail that is positioned between the rear wheels on one side of the trailer;

FIG. 12 is a top plan view of the rear wheels shown apart from the trailer, such view including a plan view of the guide rail;

FIG. 13 is a side elevational view of the rear wheels and the guide rail;

FIG. 14 is a cross-sectional view taken substantially along line 14—14 of FIG. 18;

FIG. 15 is a side elevational view of a lifter assembly, with the cylinder body and piston head portions of the assembly shown in longitudinal section;

FIG. 16 is a longitudinal sectional view taken through one of the cylinders that is used to rotate the lifter rods;

FIG. 17 is a an axial sectional view of a spherical bearing;

FIG. 18 is a fragmentary side elevational view of a rear end portion of a trailer that is backed up against the dock, such view showing a lifter rod in the foreground that is extended;

FIG. 19 is a view like FIG. 18 but on a larger scale, showing the lifter rod rotated into a lifting position and retracted;

FIG. 20 is a view looking towards the rear end of a trailer, presenting a fragmentary view of the lower portion of the trailer box, showing the rear wheels of the trailers in phantom line, and showing side-to-side alignment beams positioned against spaced apart vertical frame members at the rear of the trailer;

FIG. 23 is an exploded pictorial view of a mechanism for coupling together the confronting ends of the conveyor slats within the trailer and on the dock, such view showing an end portion of two conveyor slats that are to be connected and further showing most of the mechanism that does the connecting;

FIG. 24 is an enlarged scale, fragmentary, longitudinal sectional view of a linear hydraulic motor that is carried by at least one conveyor slat from each slat set of the dock conveyor; of the linear hydraulic motor shown by FIG. 24 joins the cylinder end of a rotary linear hydraulic drive unit that functions to rotate a piston rod that has a hook at its outer end;

FIG. 25 is an enlarged scale, fragmentry, longitudinal sectional view where the rod end of the linear hydraulic motor shown by FIG. 24 joins the cylinder end of a rotary linear hydraulic drive unit that functions to rotate a piston rod that has a hook at its outer end;

FIG. 29 is an enlarged scale cross-sectional view taken substantially along line 29—29 of FIG. 23, and including a portion of the dock conveyor slat and some mounting frame members that are a part of the dock conveyor;

FIG. 30 is an enlarged scale cross-sectional view taken substantially along line 30—30 of FIG. 23, such view showing a hook at the outer end of the rod aligned with a tunnel opening in a lock block that is within a corresponding trailer conveyor slat;

FIG. 31 is a view like FIG. 30 but showing the hook rotated over into a lock block engaging position;

FIG. 32 is an exploded pictorial view of two end pieces that are connected to the confronting ends of the dock and vehicle conveyor slats;

FIG. 33 is a view like FIG. 32 but with the end pieces connected to end portions of the conveyor slats;

FIG. 34 is a view like FIG. 32 but taken from the opposite end of the fittings;

FIG. 35 is a view like FIG. 33 but showing the end pieces plugged together;

FIG. 36 is a view like FIG. 33 but taken towards the opposite end fitting;

FIG. 37 is a view like FIG. 35 but taken from the aspect of FIG. 14;

FIG. 39 is a fragmentary side elevational view of the piston end of the rotary lock rod, such view showing a cam at the piston end that is in a first position;

FIG. 40 is a view like FIG. 39, but showing the rod and cam rotated ninety degrees;

FIG. 41 is a longitudinal sectional view taken substantially along line 41—41 of FIG. 25, such view showing the piston of the rotary linear hydraulic motor extended;

FIG. 42 is a view like FIG. 41 but showing the piston retracted;

BEST MODE FOR CARRYING OUT THE INVENTION

Figure 5:
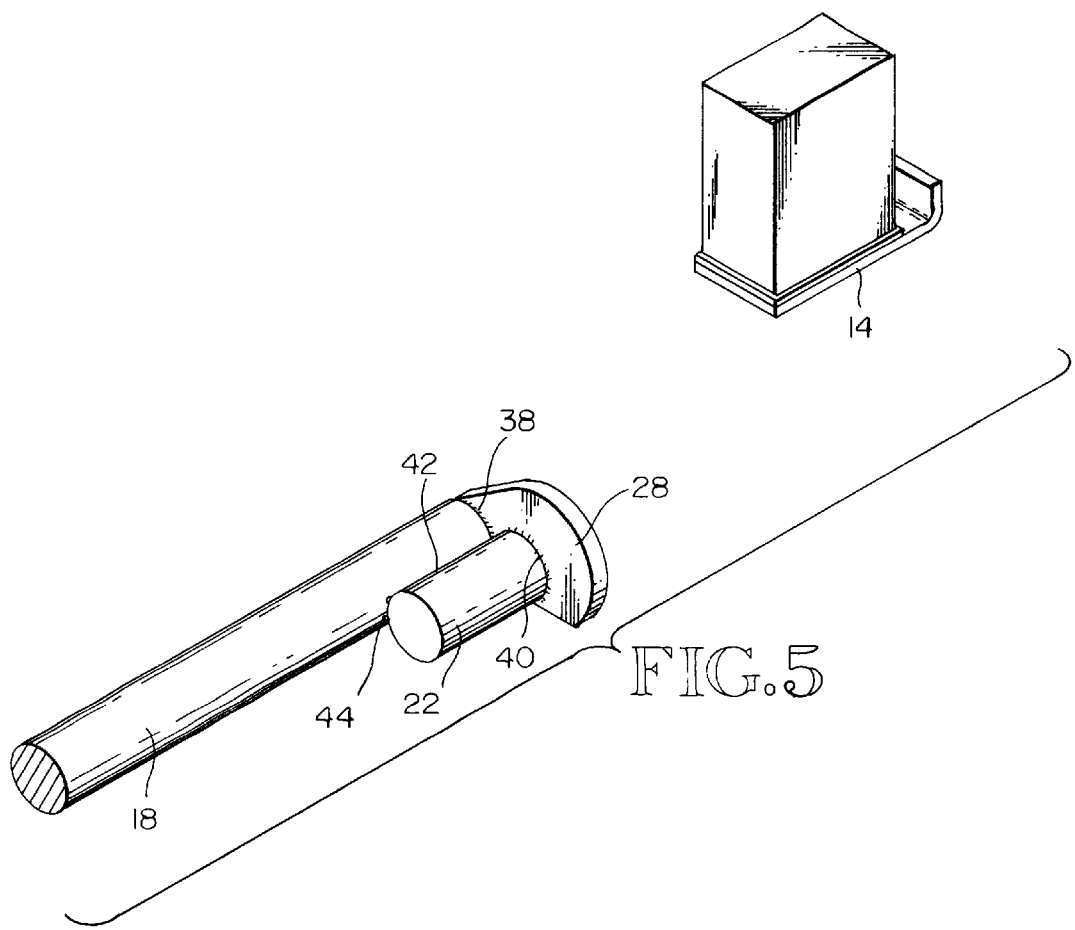
FIG. 5 is a fragmentary pictorial view of the trailer end portion of the lifter rod in its first position and spaced from a rear corner portion of the trailer's cargo box.
Figure 6:
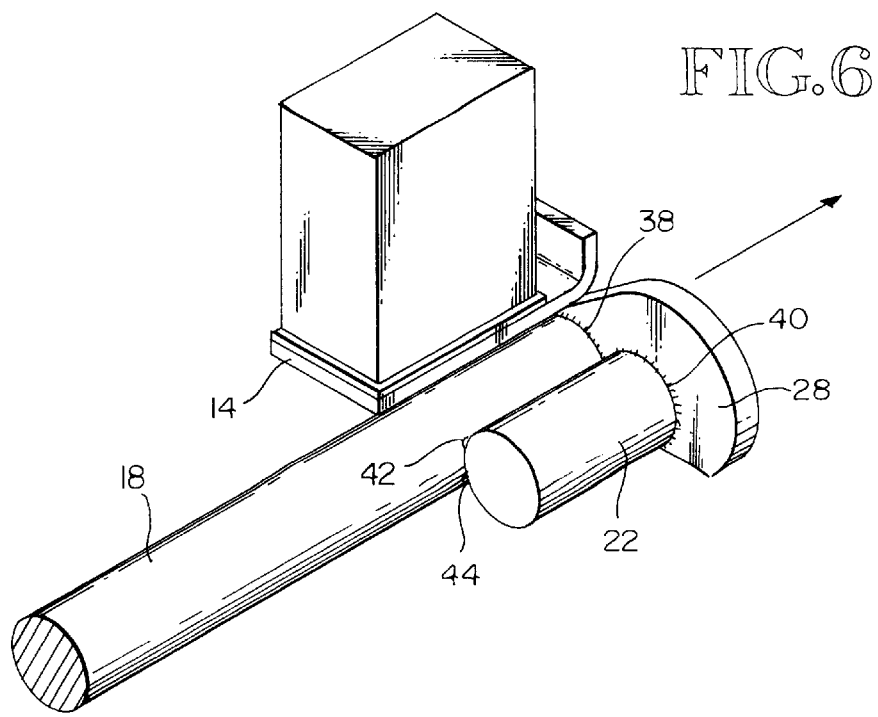
FIG. 6 is a view like FIG. 5 but showing the lifter rod extended towards the corner portion, into a position below the corner portion.
Figure 7:
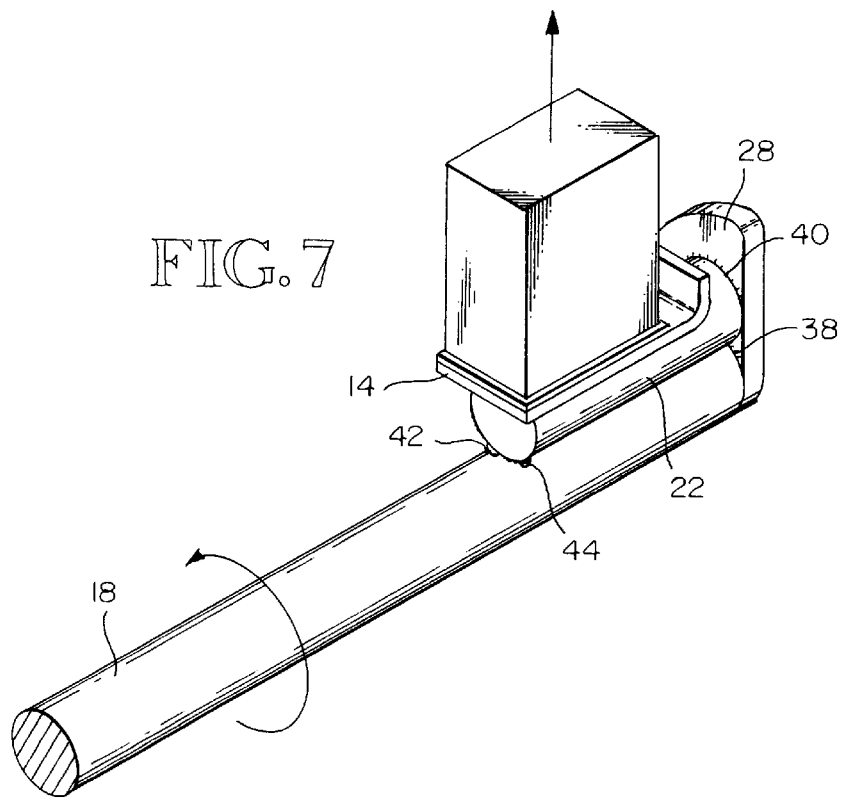
FIG. 7 is a view like FIGS. 5 and 6, but showing the lifter rod being rotated to move its cam into lifting contact with the lower part of the corner portion.
Figure 8:
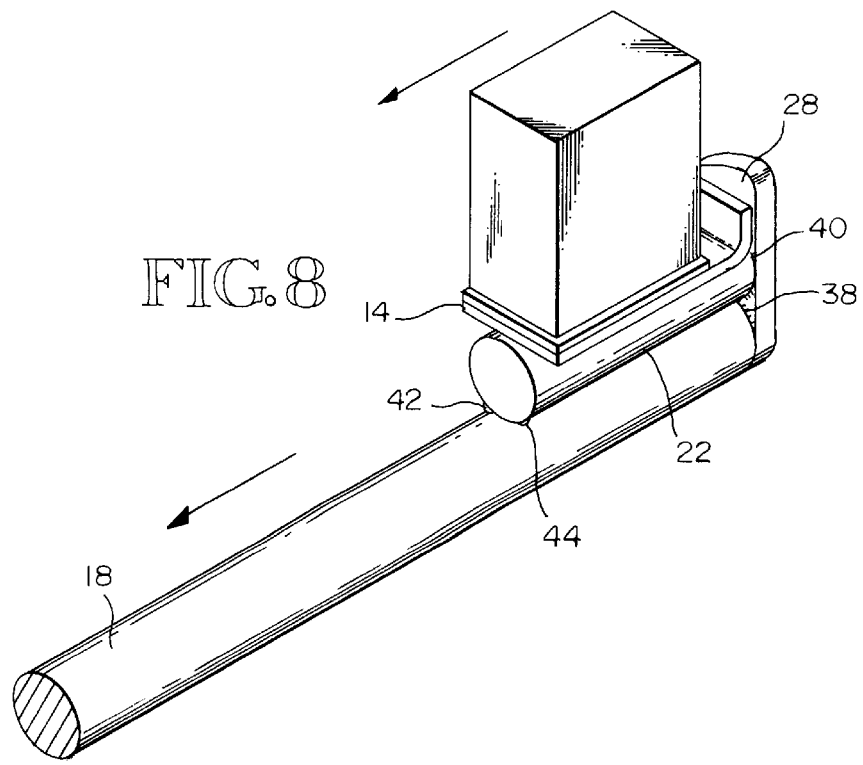
FIG. 8 is a view like FIGS. 5–7, but showing the lifter rod being retracted to move its restraining hook against the rear corner of the trailer's cargo box.

FIG. 1 shows a trailer T that includes a first reciprocating slat conveyor 10 and a dock D that includes a second reciprocating slat conveyor 12. Although a trailer T is shown, the vehicle may be a truck or some other vehicle having a cargo carrying bed or box. The conveyors 10, 12 will hereinafter sometimes be referred to as the vehicle conveyor 10 and the dock conveyor 12. FIG. 1 shows the vehicle conveyor 10 in alignment with the dock conveyor 12. In use, the two conveyors are operated together to either move a load from the trailer conveyor 10 onto the dock conveyor 12 or from the dock conveyor 12 onto the trailer conveyor 10. In this manner, the two conveyors 10, 12 are used together for loading or unloading the trailer T or other vehicle. The conveyors 10, 12 may be basically like any of the conveyors disclosed in the aforementioned U.S. Pat. Nos. 4,821,868; 5,165,524; and 5,605,221 or in the aforementioned application Ser. No. 08/827,620. One difference, however, is that one of the conveyors 10, 12 may be a passive conveyor. This means that it does not include its own drive mechanism and also may not even include transverse drive beams. The other conveyor of the pair includes a drive mechanism that serves as a drive mechanism for both conveyors 10, 12. In preferred form, the dock conveyor 12 will include a drive mechanism. The vehicle conveyor 10 will be without its own drive mechanism. It will be a passive conveyor and will be driven by the drive mechanism for dock conveyor 12.

As earlier stated, the conveyor slats of the vehicle conveyor 10 can be directly coupled to the conveyor slats of the dock conveyor 12. Or, the vehicle conveyor 10 may be provided with transverse drive beams and a mechanism may be provided for coupling the dock conveyor 12 with these transverse drive beams. For example, the vehicle conveyor 10 may be provided with three transverse drive beams, one for each set of conveyor slats, in the manner disclosed by U.S. Pat. No. 5,165,524. Then, three of the conveyor slats for conveyor 10, one for each set of conveyor slats and, hence, one for each transverse drive beam, may be coupled at its end to a confronting end of a corresponding slat of the power driven dock conveyor 12. Or, a mechanism may be provided for coupling the transverse drive beams of the powered dock conveyor 12 with the transverse drive beams of the passive vehicle conveyor 10.

FIGS. 2 and 3 are diagrams looking towards the rear end of the trailer or other vehicle T. At its opposite sides, the vehicle T has lower rear corner portions 14, 16. According to an aspect of the invention, the dock D is provided with a lifting rod 18, 20 positioned generally vertically below the corner portions 14, 16. Each lifting rod 18, 20 may include a lifting cam 22, 24. FIG. 2 shows the lifting rods 18, 20 rotated to place the lifting cams 22, 24 below the corner portions 14, 16 of the vehicle T. FIG. 3 shows the lifting rods 18, 20 rotated to place the lifting cams 22, 24 into lifting engagement with the corner portions 14, 16 of the vehicle T.

FIG. 4 is a view of lifting rod 20 and lifting cam 24. It is shown to include a hook forming end piece 26, the purpose of which is hereinafter described. Lifting rod 18 and lifting cam 24 are of like construction. They also are connected to a hook forming member 28. Hook forming member 26, or simply hook 26, is welded to the ends of lifting rod 20 and lifting cam 24, by weld beads 30, 32. Weld beads 34, 36 weld the rods 20, 24 together. In similar fashion, hook member 28, or simply hook 28, is welded to the ends of lifting rod 18 and lifting cam 22, by weld beads 38, 40. Rods 18, 22 are welded together by weld beads 42, 44. Of course, it is to be understood that the invention is not limited to the disclosed way of constructing the lifting cams 20, 22 and the hooks 26, 28. The invention includes any functionally equivalent structure.

Referring to FIG. 15, the lifter rod 18 is shown to be a piston rod portion of a hydraulic actuator 50 that includes a stationary housing 52. Housing 52 includes a bearing/seal assembly 54 at each of its ends. The rod 18 includes two opposite end portions. The first end portion projects from the dock towards the vehicle. It includes the cam 22 and the hook 28. It will be referred to as the cam end portion. The opposite end portion of rod 18 extends away from the vehicle. It is designated 56. A rotor structure is connected to portion 56 and functions to rotate the rod 18. Thus, the bearing/seal assemblies 54, support the rod 18 for both back and forth axial movement and for rotation about the longitudinal axis of the housing 52. A piston head 58 is secured to the rod 18 inside the housing 52. It divides the interior of the housing 52 into first and second working chambers 60, 62. A first inlet/outlet port 64 leads into and out from working chamber 60. A second inlet/outlet port 66 leads into and out from working chamber 64. When fluid pressure is introduced into chamber 60 and chamber 62 is connected to return, the rod 18 is moved away from the dock end and towards the trailer. When fluid pressure is introduced into working chamber 62 and the working 60 is connected to return, the rod 18 is moved back from the trailer towards the dock.

Figure 21:
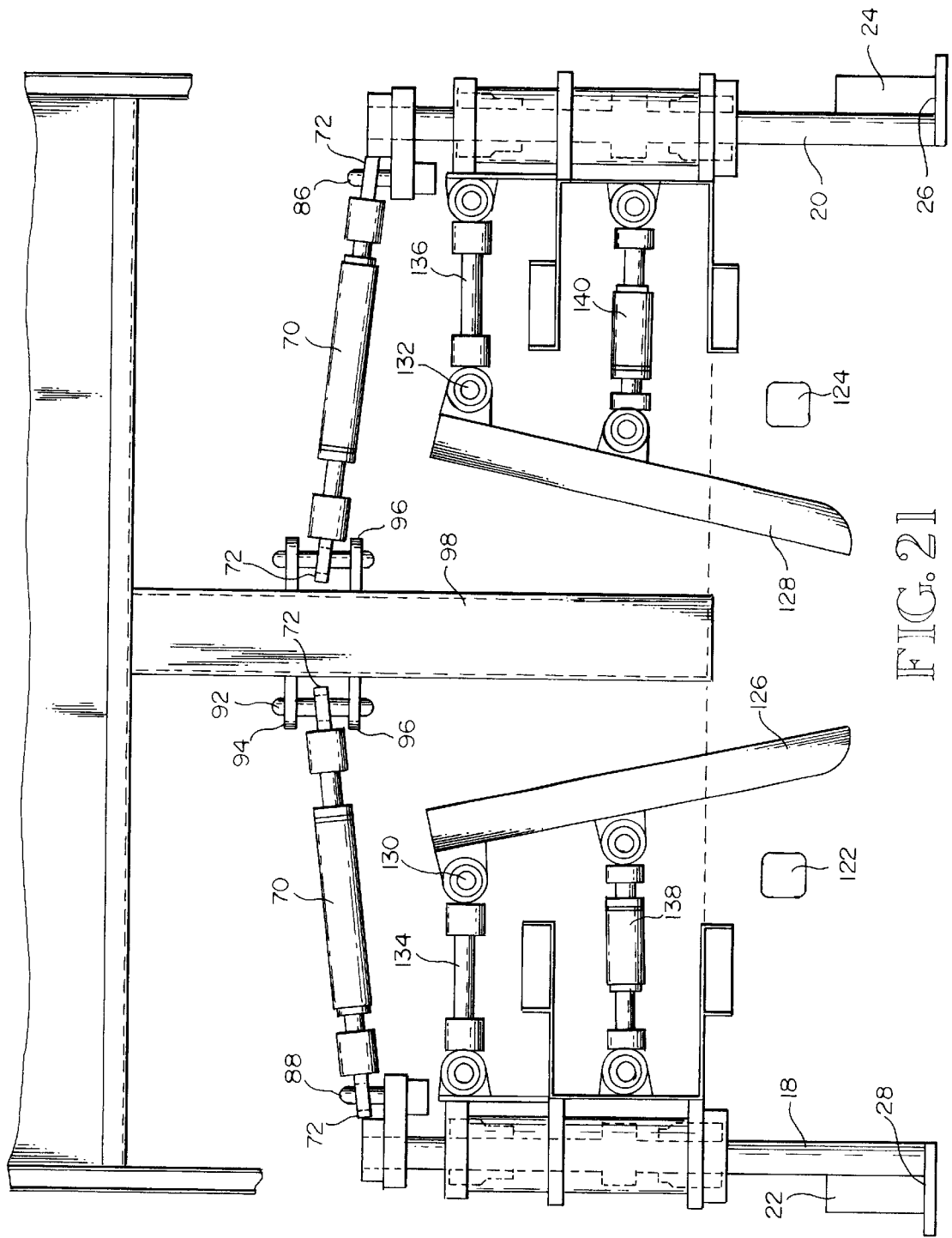
FIG. 21 is a plan view of the lifters and the side-to-side alignment mechanism, showing the alignment beams moved together for insertion between the vertical frame members of the trailer.
Figure 22:
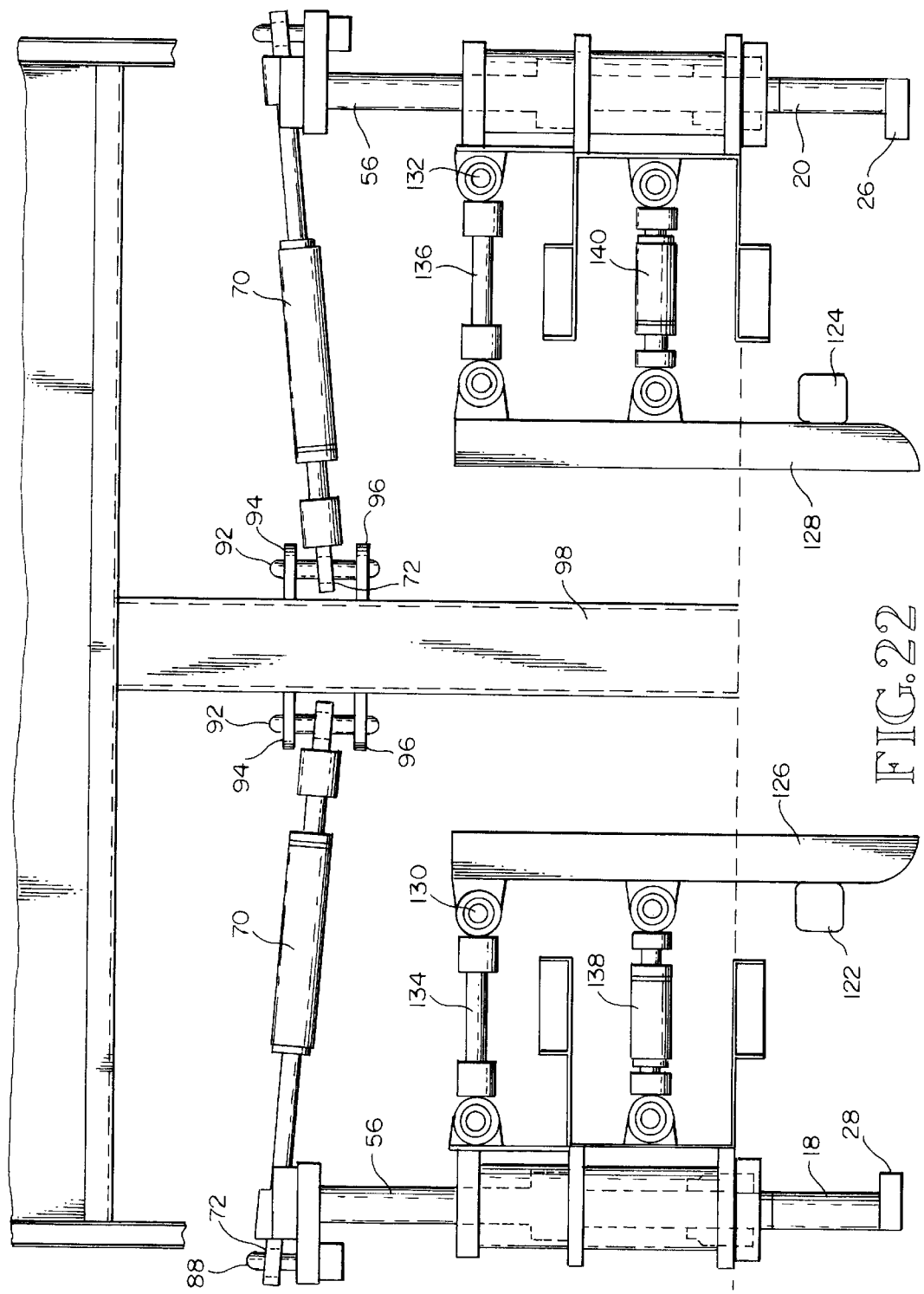
FIG. 22 is a view like FIG. 21, but showing the side-to-side alignment beams pulled apart, into a position for contacting the vertical frame members on the trailer and moving the cargo box of the trailer sideways to place its conveyor slats into substantial alignment with corresponding conveyor slats on the dock.
Figure 26:
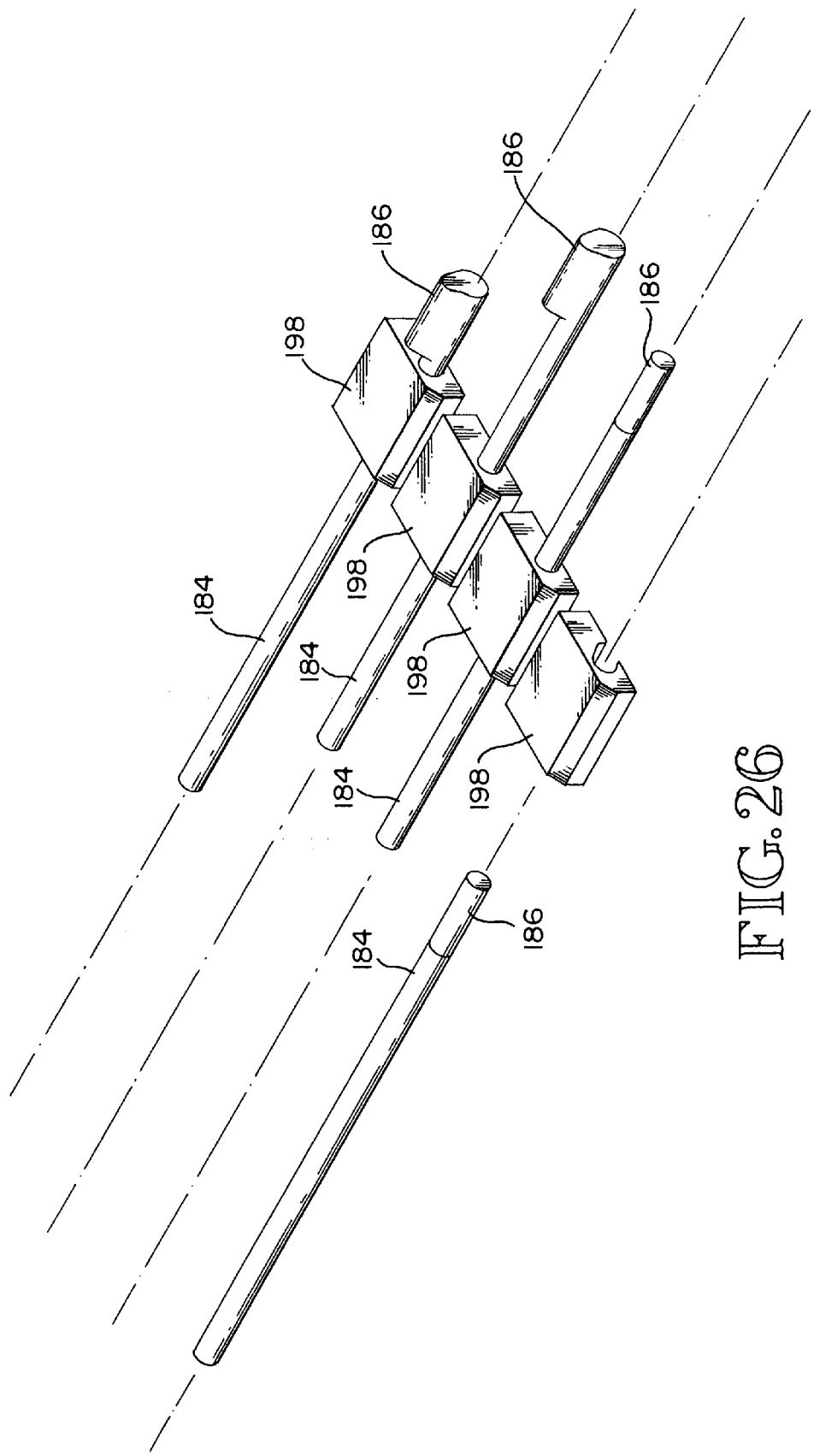
FIG. 26 is a pictorial view of several lock rods in various positions relative to lock blocks that are in the conveyor slats that are in the trailer.
Figure 27:
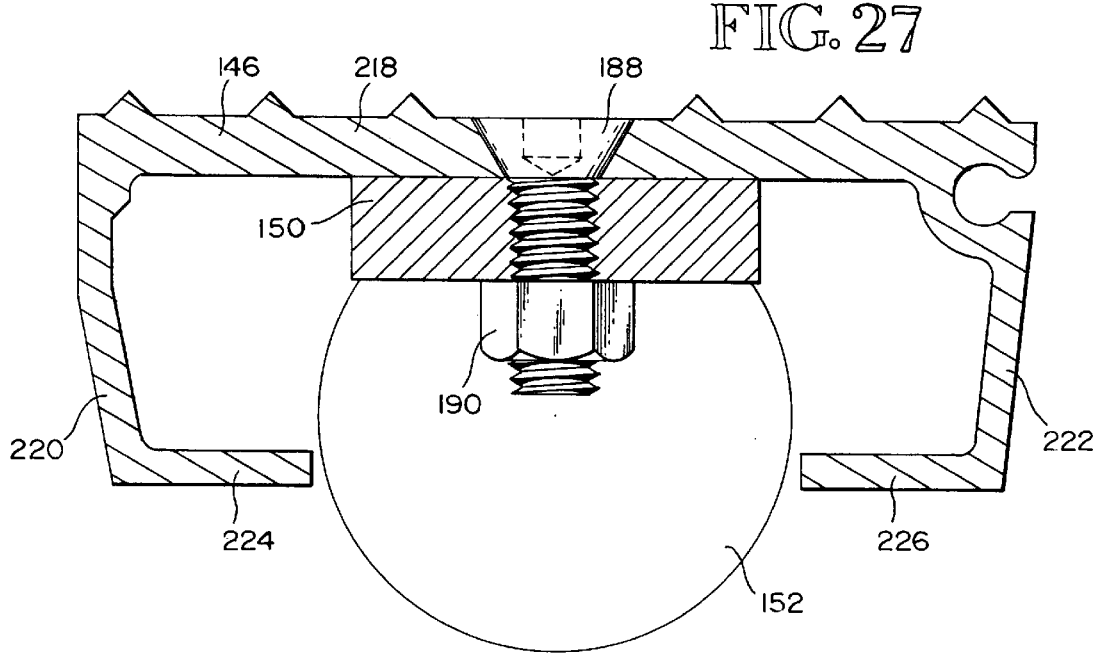
FIG. 27 is an enlarged scale, cross-sectional view taken substantially along 27—27 of FIG. 24.
Figure 28:
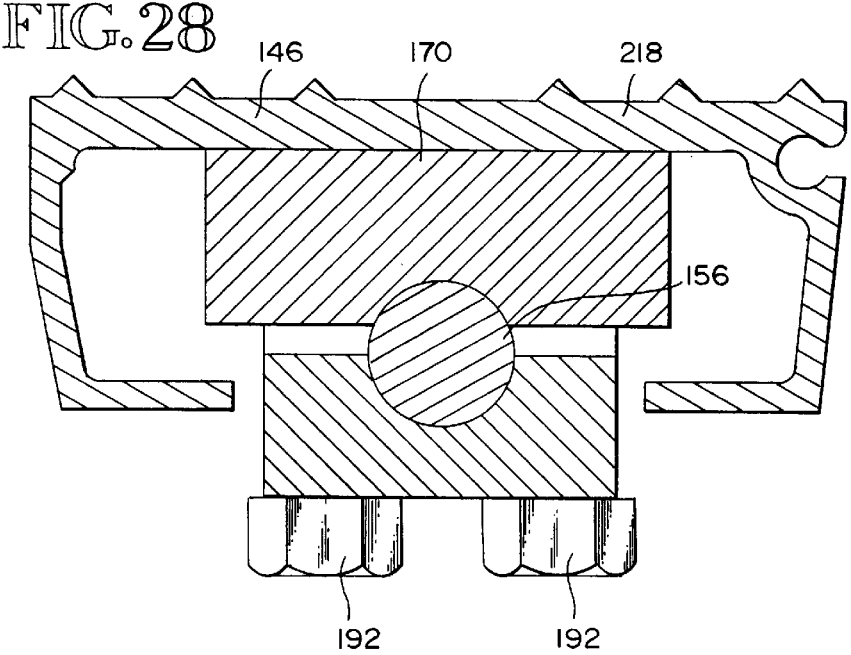
FIG. 28 is an enlarged scale, cross-sectional view taken substantially along line 28—28 of FIG. 25.
Figure 38:
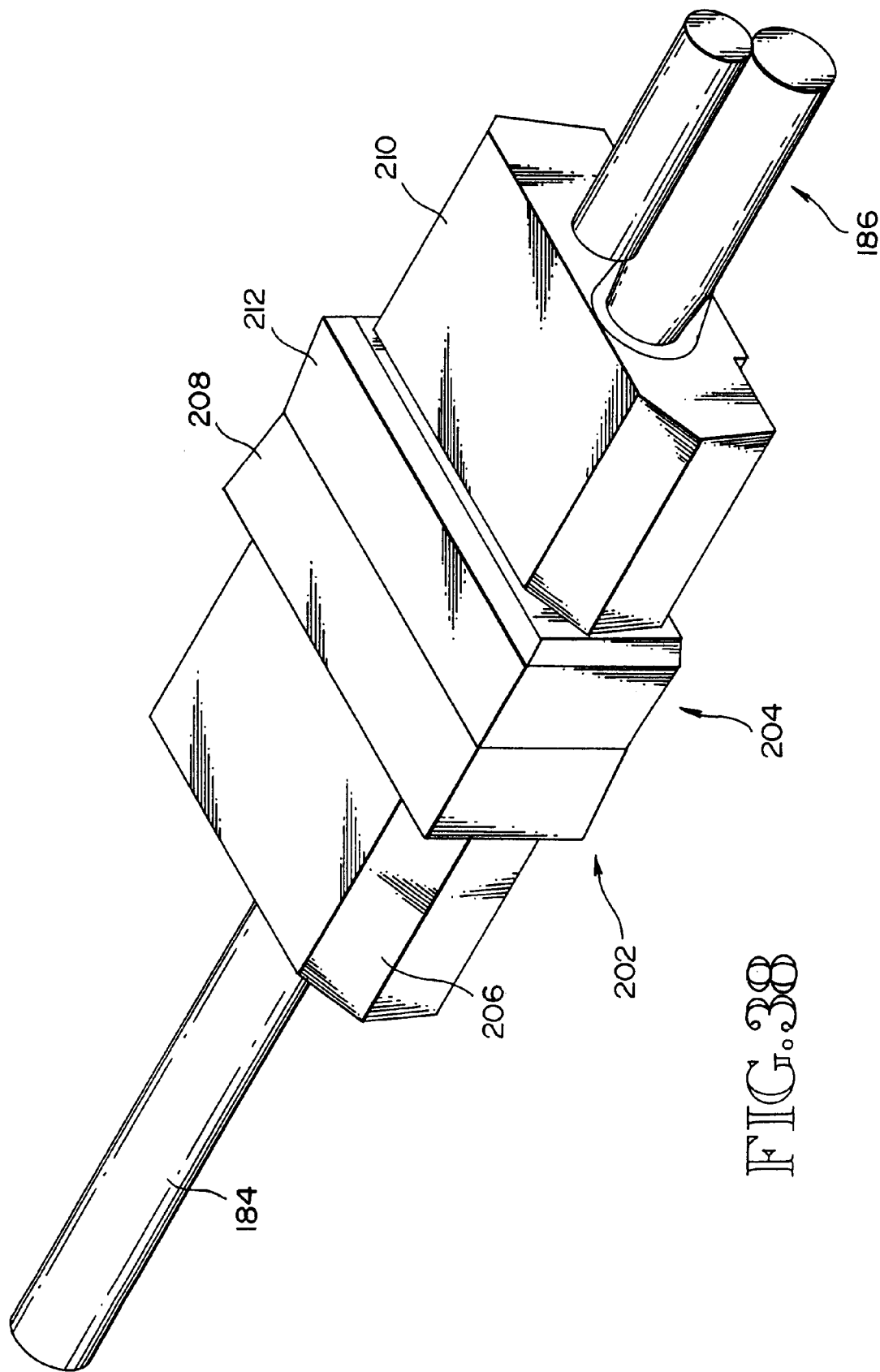
FIG. 38 is a view taken from the aspect of FIG. 32, but showing the two end fittings together and further showing the lock rod in place and rotated to place its hook into a lock position.

The rotator may include a radial arm 68 connected to the end portion 56. As best shown by FIGS. 21 and 22, a ball joint or the like is provided at each end of a second actuator 70 that is associated with each actuator 50. The ball joints are designated 72 in the drawing figures. The principal components of a conventional ball joint spherical bearings are shown by FIG. 17. FIG. 17 includes dimension lines labeled A–E. The ball joint used will have appropriate dimensions A–F.

Each actuator 70 includes a cylinder body 74, a piston rod 76, and a piston head 78. The piston head 78 is connected to the piston rod 76 inside of the cylinder body 74. A first inlet/outlet port 80 leads into and out from a first working chamber 82. A second inlet/outlet port 84 leads into and out from a second working chamber 86. When fluid pressure is introduced into working chamber 82 and working chamber 86 is connected to return, the piston rod 76 is extended out from the cylinder body 74. When fluid pressure is introduced into working chamber 86 and removed from working chamber 82, the piston rod 76 is retracted into the cylinder body 74. This length change of the actuator 70 imposes a force on the crank arm 68 causing the lifter rod 18 to rotate one way or the other. The ball connection 72 at the end of the actuators 70 allow the actuators to swing in position, as necessary, in response to their extension and retraction and in response to axial and rotary movement of the lifter rods 18. As best shown by FIG. 21, a mounting pin 88 extends through an opening 90 and crank arm 68 and through the inside component of the ball joint. Another mounting pin 92 extends between a pair of ears 94, 96 that project outwardly from a support member 98 that is a part of the dock end. Pin 92 also extends through an inner component of a ball joint.

FIG. 14 shows a first actuator 70 on the left (as pictured) in a retracted position and a second actuator 70 on the right (as pictured) in an extended position. It shows that retraction of an actuator 70 will cause rotation of the associated lifter arm into a position that lowers its lifting cam out of contact with the corner portion of the trailer. Extension of the actuator 70 rotates the lifter rod to move its lifter cam upwardly into lifting contact with the corner portion of the trailer. In actual use, the two actuators would not be in the position shown by FIG. 14. They would either both be extended or both retracted.

FIG. 14 is looking towards the dock end of the dock D. The dock D includes a top 102 that includes the dock conveyor 12. Any suitable frame structure may be used for supporting the components that are illustrated and described.

Referring to FIGS. 9 and 10, the crank 68 includes an opening 104 in which end portion 56 of lifter rod 18 is received. The arm 68 is secured to the rod 18 in any suitable manner.

Referring to FIGS. 11–13, the dock region includes a vehicle supporting apron 106 which leads towards the dock end 100. The trailer or other vehicle T is backed up on this apron 106 to place its rear end next to the dock end 100, in substantial alignment with the dock conveyor 12. This process is aided by a track 108 that is secured to the dock apron 106. Track 108 may be substantially triangular in cross-section and is sized and shaped to fit between the inside and outside wheels on one side of the trailer. This is shown in FIGS. 11 and 12. In these figures the wheels are designated W. The track 108 guides the two pairs of wheels on its side of the trailer backwards along a straight line as the trailer T is backing up. The track 108 is positioned so that it will guide the trailer to position the vehicle conveyor 10 into substantial horizontal alignment with the dock conveyor 12.

When the vehicle conveyor 10 is substantially against the dock end 100, the lifter rods 18, 20 are extended to move the cams 22, 24 below the trailer corners 14, 16 and the hooks 26, 28 in a position forwardly of lower forward parts of the corner portions 14, 16. This extension of the lifter rods 18, 20 is accomplished by introducing fluid pressure in working chambers 60 while connecting working chambers 62 to return. Next, the actuators 70 are extended to rotate the lifter rods 18 and move the cams 22, 24 up into lifting contact with the corner structures 14, 16.

FIG. 20 is a view looking towards the rear end of the trailer T. It shows a bumper structure at the rear end of the trailer that includes a lower horizontal member 120 and a pair of vertical frame members 122, 124. It is a common construction of a trailer to include members like members 120, 122, 124. FIG. 20 also includes end view of two longitudinal beams 126, 128 that are shown between and against the vertical frame members 122, 124. Referring to FIG. 21, the beam members 126, 128 are preferably connected at their rear ends for pivotal movement about a vertical axis 130, 132. The pivot connections are at the inner ends of a pair of turn buckles 134, 136. The outer ends of the turn buckles 134, 136 are connected to a frame which may be the same frame to which the cylinder bodies 50 are connected. Hydraulic actuators 138, 140 are interconnected between the frame of the dock end and intermediate portions of the beams 126, 124. The actuators 138, 140 are shown extended in FIG. 21. It is this extension that moves the beams 126, 128 towards each other. The beams 126, 128 are positioned between the trailer frame members 122, 124 when the trailer is backed up to the dock end 100 and the actuators 138, 140 are in the position shown by FIG. 21. Then, the actuators 138, 140 are retracted. The turn buckles 134, 136 are adjusted beforehand so that when the actuators 138, 140 are fully retracted, the beams 126, 128 will positioned against the inner surfaces of the frame members 122, 124. As a result, if the rear end of the trailer is not properly centered beforehand, retraction of the actuators 138, 140 will move the two beams 126, 128 into position in which one of them will have to exert a sideways force on one of the members 122, 124, because of the misalignment. This sideways force is exerted on the rear end portion of the trailer and will shift the rear end portion of the trailer sideways a sufficient amount to provide proper alignment. As is known to those skilled in the art, a trailer bed or box can shift in position somewhat on the trailer suspension. Enough sideways movement is permitted so that this system can be used for shifting the rear end portion of the trailer in position to provide proper sideways alignment.

FIGS. 23–42 show the same structure that is shown by FIGS. 2–20 of the copending companion application Ser. No. 09/076,505, now U.S. Pat. No. 5,911,555, entitled Vehicle/Dock Loading/Unloading Conveyor System.

Referring to FIGS. 23–25, a mounting bar 150 extends endwise from a cylinder housing 152 of an actuator 154. A piston rod 156 projects from a piston head 158 out through an end 160 of the housing 152 opposite the mounting bar 150. Piston head 158 divides the interior of the housing 152 into first and second working chambers 162, 164 that are on opposite sides of the piston head 158. A first inlet/outlet port 166 leads to and from working chamber 162. A second inlet/outlet port 168 leads to and from working chamber 164.

The introduction of fluid pressure into chamber 164 while port 166 is connected to return cause the piston 156 to retract within the housing. Introduction of fluid pressure into chamber 162 while port 168 is connected to return will cause an extension of the piston rod 156.

As best shown by FIG. 25, the end of piston rod 156 opposite the piston head 158 is connected to a first end 170 of a second cylinder housing 172. Cylinder housing 172 includes a piston head 174 that is at one end of a piston rod 176. Piston rod 176 projects endwise outwardly from the second end 178 of housing 172 to and through a guide structure 180, 182 the upper portion 182 of which is located inside of the conveyor slat 146. Rod 176 includes an end portion 184 that projects endwise outwardly from the structure 180, 182. It includes a hook 186 at its end. As shown by FIGS. 24 and 25, the assembly 160 fits up inside of the conveyor slat 146. Nut and bolt assemblies 188, 190 connect the member 150 to the conveyor slat 146. Bolts 192 (FIG. 26) connect member 170 to the end of housing 172.

The conveyor slats 146, 148 are supported in both conveyors by the support beam/bearing construction that is, by way of example, is disclosed in U.S. Pat. No. 4,858,748, granted Aug. 22, 1989 to Raymond Keith Foster and entitled Bearing System For Reciprocating Floor Conveyor and in U.S. Pat. No. 5,303,816, granted Apr. 19, 1994 to Raymond Keith Foster and entitled Seal Strip For Reciprocating Floor Conveyors. Referring to FIG. 29, the members 180 are connected to conveyor frame members 196 which are stationary. Member 182 may be stationary or movable. Members 180, 182 may be constructed from a self-lubricating plastic bearing material. At times, there is relative movement between rod 184 and members 180, 182.

In this embodiment, the conveyor slats 148 include internal members 198 that are secured to the conveyor slats 148. Members 198 include tunnel openings 200 that are sized and shaped to receive the hook portion 186 at the end of rod 184. FIG. 30 shows the hook portion 186 inside the tunnel opening 200. FIG. 31 shows the hook portion 186 inwardly of member 198 and rotated into a position out of alignment with opening 200 and in alignment with a portion of the member 196. Referring to FIGS. 32–38, in preferred form, the conveyor slats 146, 148 are provided with end members 204, 204. End members 202 include inner end portions 206 which extend into the conveyor slats 146. Members 202 include outer end portions 208 which are positioned endwise outwardly of the conveyor slats 146 when the members 202 are connected to the conveyor slats 146. End members 204 have inner end portions 210 that fit into the conveyor slat 146. They include outer end portions 212 that are positioned endwise outwardly of the conveyor slats 148 when the end members 204 are connected to the conveyor slats 148. End members 204, 204 and conveyor slats 146, 148 may all be constructed from an aluminum alloy. The end members 202, 204 may be connected to the conveyor slats 146, 148 by welding. A weld bead may be applied for the ends of conveyor slats 146, 148 contact the end portions 208, 210 of the end pieces 202, 204. In the preferred embodiment, the end members 204 serve the purpose of the members 198. They include the tunnel openings 200. The end members 202 may be positioned endwise outwardly of the members 182.

According to an aspect of the invention, one of the end pieces 202, 204 may include a recess at its outer end and the other may include a complementary projection. In the illustrated embodiment, end members 202 include a recess 214 and the end pieces 208 include a complementary projection 216. As illustrated, the recesses 214 and projections 214 may be oval in shape and may be tapered. When the conveyor slats 146, 148 are moved together (FIGS. 28 and 305) the projections 216 enter into the recesses 214. The tapering surfaces contact each other and this moves the conveyor slats 146, 148 into substantially precise alignment with each other.

Referring to FIGS. 27–31, the conveyor slats 146, 148 are each shown to have a flanged channel shape. They each include a top 218, a pair of opposite sidewalls 220, 222 and a pair of bottom flanges 224, 226. The sidewalls 220, 224 depend generally downwardly from the tops 218. The flanges 224, 226 project inwardly towards each other, in coplanar parallelism. The flanges 224, 226 are in spaced parallelism with the tops 218.

Referring to FIGS. 23–25 and 39–42, the piston head 174 includes a seal groove 226 in which an O-ring seal 228 is received (FIGS. 25, 41 and 42). Piston head 174 includes an end portion 230, extending from it in a direction opposite the rod 176. This end portion 230 includes a cam surface 232 that is helical and substantially like a screw thread. It contacts a stationary pin 234. A first inlet/outlet port 104 communicates with a first working chamber 240. A second inlet/outlet port 239 communicates with a second working chamber 242. Introduction of fluid pressure into working chamber 240, while working chamber 242 is connected to return, causes an extension of the piston rod 176. It also causes a rotation of the piston rod 176 and the hook 186 because of contact between cam surface 232 and pin 234. The cam surface 232 is configured to cause about ninety degrees of rotation of the piston rod 176 in response to a full extension of the piston rod 176. When fluid pressure is introduced into working chamber 242 and working chamber 240 is connected to return, the piston rod 176 is retracted and rotated approximately ninety degrees back to its original position.

In operation, there is a hook assembly 154 connected to at least three of the conveyor slats 146. In preferred form, each conveyor slat 146 is provided with a hook assembly 154. End portions 184 of the rods 176, including the hooks 186, project outwardly from the conveyor slats 146. When the end members 202 are used, they project outwardly from the end members 202. Following placement of the conveyor slats 148 and substantial alignment with the conveyor slats 146, fluid is introduced into the working chambers 162 and working chambers 164 are connected to return so that the rods 156 and the cylinder housings 172 connected to them are extended. This extension causes axial movement of the end portions 184 and hooks 186 through the tunnel openings 200. The hook portions 186 are moved completely through the end members 194. Then, fluid pressure is introduced into one of the working chambers 240, 242 and the other is connected in return, to cause both an axial movement and rotation of the rods 176, their end portions 184 and the hooks 186, to move the hooks from the position shown in FIG. 30 into the position shown in FIG. 31. This places the inserts 204 into the path of the hook members 186. Then fluid pressure is introduced into working chambers 164 and working chambers 162 are connected to return, so that the rods 156 are retracted. This pulls the housings 172 and the rods 176 into the conveyor slats 146 and moves the hooks 186 into tight contact with the end members 204. This also moves the projections 216 tightly into the recesses 214, causing the tapered side surfaces of the projections 216 and the recesses 214 to cam the conveyor slats 146, 148 into a substantially precise alignment. The engagement of the projections 216 in the recesses 214 also holds against rotation of conveyor slats 146, 148, each relative to the other.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A loading/unloading dock, comprising:

a dock end;

a vehicle supporting apron leading to the dock end;

a dock floor elevated above the vehicle supporting apron and extending along a longitudinal axis from the dock end opposite from the vehicle supporting apron; and said dock end including a pair of laterally spaced apart lifters, each said lifter including a rotatable lifter rod and a lifting cam on the lifting rod, said lifter rods extending substantially horizontally, substantially parallel to each other and substantially perpendicular to the dock end, whereby a vehicle having a cargo space and a cargo space floor can be backed up on the vehicle supporting apron, towards the dock end, to place the cargo space floor substantially in longitudinal alignment with the dock floor, and then the lifter rods can be rotated to move the lifting cams upwardly against a rear portion of the vehicle, to cause the cams to lift the rear portion of the vehicle and raise the cargo space floor up to a level substantially even with the dock floor.

2. A loading/unloading dock according to claim 1, wherein the rotatable lifter rods are rotatable between a first position in which the cams are below and out of lifting contact with the rear portion of the vehicle, and a second position in which the cams are in lifting contact with the rear portion of the vehicle.

3. A loading/unloading dock according to claim 2, wherein the rotatable lifter rods are also movable axially, so that they can be moved axially to position the cams relative to the rear portion of the vehicle.

4. A loading/unloading dock according to claim 3, wherein the rotatable lifter rods have hook portions that are engageable with the rear portion of the vehicle when the cams are in lifting contact with the rear portion of the vehicle, said lifter rods being movable axially towards the dock end to move the hooks into contact with the rear portion of the vehicle where they will restrain movement of the vehicle away from the dock end.

5. A loading/unloading dock according to claim 4, wherein said rotatable lifter rods are piston rod portions of linear hydraulic motors, said linear hydraulic motors further including cylinder bodies mounted on the dock end through which the rotatable lifter rods project, and piston heads on the rotatable lifter rods inside of the cylinder bodies, said cylinder bodies providing working chambers on opposite sides of the piston heads.

6. A loading/unloading dock according to claim 5, wherein the rotatable lifter rods have first end portions that project axially outwardly from first end portions of the cylinder bodies, away from the dock end towards the vehicle, and said lifting cams and said hook portions are on said first end portions of the rotatable lifter rods.

7. A loading/unloading dock according to claim 6, wherein the rotatable lifter rods have second end portions that project axially outwardly from second ends of the cylinder bodies that are opposite the first ends, and a rotator is connected to the second end portion of each rotatable lifter rods, for rotating the lifter rod between its first and second positions.

8. A loading/unloading dock according to claim 7, wherein the rotator includes an arm that projects radially from the second end portion of the rotatable lifter rod, said dock further comprising a second linear hydraulic motor having at a first end connected to the dock end and at a second end connected to the radial arm, said second linear hydraulic motor being extendable and retractable for swinging the radial arm to rotate the lifter rod.

9. A loading/unloading dock according to claim 8, wherein each second linear hydraulic motor has a pivot connection at each of its ends, allowing each second linear hydraulic motor to pivot in position in response to its extension and retraction as well as rotation and axial movement of the rotatable lifter rod to which it is connected.

10. A loading/unloading dock portion according to claim 4, wherein the hook portions are members on the rotatable lifter rods that project radially outwardly beyond the lifting cams.

11. A loading/unloading dock according to claim 10, wherein when the lifter rods are in their first position the hook portions are below and out of contact with the rear portion of the vehicle, and when the lifter rods are in their second positions, the hook portions are positioned adjacent radial surfaces on of the rear portion of the vehicle against which the hook portions can be pulled.

12. A loading/unloading dock according to claim 3, wherein said rotatable lifter rods are piston rod portions of linear hydraulic motors, said linear hydraulic motors further including cylinder bodies mounted on the dock end through which the rotatable lifter rods project, and piston heads on the rotatable lifter rods inside of the cylinder bodies, said cylinder bodies providing working chambers on opposite sides of the piston heads.

13. A loading/unloading dock according to claim 12, wherein the rotatable lifter rods have first end portions that project axially outwardly from first end portions of the cylinder bodies, away from the dock end and towards the vehicle, and said lifting cams are on said first end portions of said rotatable lifter rods.

14. A loading/unloading dock according to claim 13, wherein the rotatable lifter rods have second end portions that project axially outwardly from second ends of the cylinder bodies that are opposite the first ends, and a rotator is connected to the second end portion of each rotatable lifter rod, for rotating the lifter rod between its first and second positions.

15. A loading/unloading dock according to claim 14, wherein the rotator includes an arm that projects radially from the second end portion of the rotatable lifter rod, said dock further comprising a second linear hydraulic motor that is connected at a first end to the dock end and at a second end to the radial arm, said linear hydraulic motor being extendable and retractable for swinging the radial arm to rotate the lifter rod.

16. A loading/unloading dock according to claim 1, wherein the dock floor and the cargo space floor are reciprocating slat conveyors.

17. A loading/unloading dock according to claim 16, wherein the lifter rods are rotatable between a first position in which the cams are below and out of lifting contact with the rear portion of the vehicle, and a second position in which the cams are in lifting contact with the rear portion of the vehicle.

18. A loading/unloading dock according to claim 17, wherein the rotatable lifter rods are also movable axially, so that they can be moved axially to position the cams relative to the rear portion of the vehicle.

19. A loading/unloading dock according to claim 18, wherein the lifter rods have hook portions that are engageable with the rear portion of the vehicle when the cams are in lifting contact with the rear portion of the vehicle, said lifter rods being movable axially towards the dock end to move the hooks into contact with the rear portion of the vehicle where they will restrain movement of the vehicle away from the dock end.

20. A loading/unloading dock according to claim 19, wherein said rotatable lifter rods are piston rod portions of linear hydraulic motors, said linear hydraulic motors further including cylinder bodies mounted on the dock end through which the rotatable lifter rods project, and piston heads on the rotatable lifter rods inside of the cylinder bodies, said cylinder bodies providing working chambers on opposite sides of the piston heads.

21. A loading/unloading dock according to claim 1, comprising at least one guide rail on the vehicle supporting apron, positioned to engage at least one rear wheel on the vehicle, for guiding the vehicle into a position in which the dock floor is substantially in line with the cargo space floor in the vehicle.

22. A loading/unloading dock according to claim 21, wherein the lifter rods are rotatable between a first position in which the cams are below and out of lifting contact with the rear portion of the vehicle, and a second position in which the cams are in lifting contact with the rear portion of the vehicle.

23. A loading/unloading dock according to claim 22, wherein the rotatable lifter rods are also movable axially, so that they can be moved axially to position the cams relative to the rear portion of the vehicle.

24. A loading/unloading dock according to claim 23, wherein the lifter rods have hook portions that are engageable with the rear portion of the vehicle when the cams are in lifting contact with the rear portion of the vehicle, said lifter rods being movable axially towards the dock end to move the hooks into contact with the rear portion of the vehicle where they will restrain movement of the vehicle away from the dock end.

25. A loading/unloading dock according to claim 24, wherein said rotatable lifter rods are piston rod portions of linear hydraulic motors, said linear hydraulic motors further including cylinder bodies mounted on the dock end through which the rotatable lifter rods project, and piston heads on the rotatable lifter rods inside of the cylinder bodies, said cylinder bodies providing working chambers on opposite sides of the piston heads.

26. A loading/unloading dock according to claim 1, further comprising a member on said dock end that is movable sideways against a rear portion of the vehicle, to impose a sideways force on the rear portion of the vehicle directed to move the cargo space floor towards alignment with the dock floor.

27. A loading/unloading dock according to claim 26, wherein the dock floor and the cargo space floor are reciprocating slat conveyors, each comprising a plurality of conveyor slats.

28. A loading/unloading dock according to claim 1, further comprising a pair of laterally spaced apart beam members supported by said dock end, each said beam member having a first end that is mounted for pivotal movement about a vertical axis, and projects from said end towards a vehicle at the dock end, into a space that is horizontally disposed between a pair of vertical frame members at the rear end of the vehicle, and power actuators connected to the beam members and a frame portion of the dock end and operable for swinging the pivotal beam members towards the vertical frame members at the rear end of the vehicle, into positions in which at least one of the pivotal beam members is in contact with at least one of the vertical frame members, to impose a sideways force on the at least one vertical frame member that is directed to move the cargo space floor towards alignment with the dock floor at least one vertical frame.

\* \* \* \* \*